United States Patent
Karino

(10) Patent No.: US 9,130,867 B2
(45) Date of Patent: Sep. 8, 2015

(54) FLOW CONTROL FOR VIRTUALIZATION-BASED SERVER

(75) Inventor: Shuichi Karino, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/137,619

(22) Filed: Aug. 30, 2011

(65) Prior Publication Data

US 2011/0320632 A1    Dec. 29, 2011

Related U.S. Application Data

(63) Continuation of application No. PCT/JP2010/071316, filed on Nov. 30, 2010.

(30) Foreign Application Priority Data

Dec. 4, 2009    (JP) ................................ 2009-276679

(51) Int. Cl.
| | | |
|---|---|---|
| *G06F 15/173* | (2006.01) | |
| *H04L 12/721* | (2013.01) | |
| *H04L 12/713* | (2013.01) | |
| *G06F 9/455* | (2006.01) | |
| *G06F 15/16* | (2006.01) | |

(52) U.S. Cl.
CPC ............. *H04L 45/38* (2013.01); *H04L 45/586* (2013.01)

(58) Field of Classification Search
CPC .... H04L 45/00; H04L 29/06; H04L 29/08072
USPC ........................................................ 709/238
See application file for complete search history.

(56) References Cited

U.S. PATENT DOCUMENTS

| | | | |
|---|---|---|---|
| 2005/0182853 A1* | 8/2005 | Lewites et al. ................ | 709/238 |
| 2006/0069792 A1* | 3/2006 | Pinkerton et al. ............. | 709/230 |
| 2006/0208718 A1 | 9/2006 | Nitta | |
| 2007/0076623 A1* | 4/2007 | Aloni et al. .................... | 370/252 |
| 2008/0102929 A1 | 5/2008 | Inamura | |
| 2009/0138887 A1 | 5/2009 | Uehara et al. | |

(Continued)

FOREIGN PATENT DOCUMENTS

| | | |
|---|---|---|
| CN | 1943179 A | 4/2007 |
| CN | 101305561 A | 11/2008 |

(Continued)

OTHER PUBLICATIONS

Written Opinion of the ISA dated Dec. 24, 2010.

(Continued)

*Primary Examiner* — Chris Parry
*Assistant Examiner* — Alan S Chou
(74) *Attorney, Agent, or Firm* — McGinn IP Law Group, PLLC

(57) ABSTRACT

A server includes a processor, a network adapter connected to the processor and a route switcher. The processor includes a virtual machine and a virtual switch relaying packets exchanged between the virtual machine and an exterior. The network adapter has a transfer function of transmitting and receiving packets to and from the virtual machine not through the virtual switch. The route switcher dynamically switches a flow of the packets transmitted and received by the virtual machine between first and second route pattern flows. And, the route switcher instructs the transfer function to process the first route pattern flow instructs the virtual switch to process the second route pattern flow.

12 Claims, 26 Drawing Sheets

(56) References Cited

U.S. PATENT DOCUMENTS

| | | |
|---|---|---|
| 2009/0204723 A1 | 8/2009 | Tonsing et al. |
| 2010/0014526 A1* | 1/2010 | Chavan et al. .......... 370/395.53 |
| 2011/0010469 A1* | 1/2011 | Kinsey et al. ................ 709/250 |
| 2012/0227041 A1* | 9/2012 | Lambeth et al. .................. 718/1 |

FOREIGN PATENT DOCUMENTS

| | | |
|---|---|---|
| EP | 1 359 724 A1 | 11/2003 |
| JP | 2007-522583 A | 8/2007 |
| JP | 2008-102929 A | 5/2008 |
| JP | 2009-506618 A | 2/2009 |
| JP | 2009-151745 A | 7/2009 |

OTHER PUBLICATIONS

International Search Report dated Jan. 11, 2011.

Chinese Office Action Dated Jul. 2, 2014 and English Translation thereof.

* cited by examiner

Fig. 7

FILT1:RECEPTION FILTER TABLE

| Key | Action |
|---|---|
| flow1 | VM1 |
| flow2 | VM2 |
| flow3 |  |
| ⋮ | ⋮ |
| * | vswitch |

Fig. 10

FILT2:RECEPTION FILTER TABLE

| Key | Action |
|---|---|
| 192.168.0.1:1025→192.168.10.5:80 | out |
| 192.168.1.2:1025→192.168.11.3:22 | out |
| 192.168.1.2:1026→192.168.11.3:22 | out |
| ⋮ | ⋮ |
| * | loopback |

Fig. 12

| Key | Action |
|---|---|
| 192.168.0.1:1025→192.168.10.5:80 | out |
| 192.168.10.5:80→192.168.0.1:1025 | VM1 |
| 192.168.1.2:1025→192.168.11.3:22 | out |
| 192.168.11.3:22→192.168.1.2:1025 | VM2 |
| 192.168.1.2:1026→192.168.11.3:22 | out |
| 192.168.11.3:22→192.168.1.2:1026 | VM2 |
| ⋮ | ⋮ |
| * | vswitch |

Fig. 17

TBL:FLOW TABLE

| Key | Action | ENTRY ON NIC |
|---|---|---|
| 192.168.0.1:1025→192.168.10.5:80 | port 1 | PRESENT |
| 192.168.10.5:80→192.168.0.1:1025 | port 0 | PRESENT |
| 192.168.1.2:1025→192.168.11.3:22 | port 2 | PRESENT |
| 192.168.11.3:22→192.168.1.2:1025 | port 0 | PRESENT |
| 192.168.1.2:1026→192.168.11.3:22 | port 2 | ABSENT |
| 192.168.11.3:22→192.168.1.2:1026 | port 0 | ABSENT |
| 0/0→192.168.11.1 | drop | ABSENT |
| ⋮ | ⋮ | ⋮ |

Fig. 18

| port 0 | external |
|--------|----------|
| port 1 | VM1      |
| port 2 | VM2      |
| ⋮      | ⋮        |

Fig. 25

TBL2:FLOW TABLE

| Key | Action |
|---|---|
| flow1 | NIC |
| flow2 | NIC |
| flow3 | vswitch |
| ... | ... |

FLOW CONTROL FOR VIRTUALIZATION-BASED SERVER

CROSS-REFERENCE TO RELATED APPLICATION

This application is a continuation of International Application No. PCT/JP2010/071316, filed on Nov. 30, 2010.

BACKGROUND OF THE INVENTION

1. Field of the Invention

The present invention relates to a server based on a virtualization technique, and a flow control method implemented by the server.

2. Description of the Related Art

The virtualization technique is of significance in the field of the server. Specifically, the virtualization technique that uses virtualization software, such as VMware (Registered Trademark) and Xen (Registered Trademark), enables one physical machine to operate as a plurality of virtual machines (VMs). This achieves an efficient server operation.

The virtualization technique also establishes a virtual switch together with virtual machines within a physical server. The virtual switch, which is a software-based packet switch, relays communications among the virtual machines and between the virtual machines and the exterior, as shown in FIGS. 1A and 1B. Since the virtual switch is positioned adjacent to the virtual machines, the traffic control is easy. Also, since the virtual switch is software-based, the virtual switch is superior in flexibility and extensibility.

Also, an I/O (input/output) virtualization technique such as VT-d/VT-c (Registered Trademark) is known in the art. The I/O virtualization technique enables directly exchanging data between the virtual machines and a network interface card (NIC) without using the virtual switch. Specifically, as shown in FIG. 2, a virtual NIC is established for each virtual machine. Then, the use of the virtual NIC allows completely bypassing the virtual switch. Hereafter, such a process is referred to as "NIC offload".

The following are known as techniques related to the virtualization.

In Japanese Laid Open Patent Application No. P2007-522583A, an apparatus is disclosed which includes at least one router and a data structure. The data structure is used to create a virtual network by organizing the connections between one or more virtual network interface cards (VNICs) with the router.

Japanese Laid Open Patent Application No. P2008-102929A) discloses a technique that uses a queue data structure to communicate with a network adaptor. A device driver calls a device driver service in order to initially set items of an address translation and protection table (ATPT) inside a route complex with regard to the queue data structure. The device driver service returns a non-conversion address to the device driver, and the non-conversion address is then provided to the network adaptor. In response to a queue element being obtained by searching the queue data structure, the network adaptor requests the conversion of the non-conversion address specified to the queue element, which enables holding a converted address in the network adaptor before the reception of a data packet targeted for a buffer related to the queue element.

Japanese Laid Open Patent Application No. P2009-151745A)) discloses a virtual machine monitor which runs a virtual server on a multi processor system. The virtual machine monitor includes a physical hardware information acquisition section, a receiver section and an assignment processor section. The physical hardware information acquisition section acquires configuration information of hardware that includes physical position information of the hardware including a processor in the multi processor system, a memory and I/O device. The receiver section receives a generation request that includes the number of the processors, a memory quantity, and an assignment policy of I/O devices and resources in virtual servers to be generated. The assignment processor section assigns the I/O devices to the virtual server in accordance with the received generation request, and then assigns the processors and the memory to the virtual server, so as to satisfy the assignment polity.

SUMMARY OF INVENTION

In the cases of FIG. 1A and FIG. 1B, the virtual switch relays all of the traffics between the virtual machines and the exterior. In other words, the traffics are concentrated on the virtual switch. Also, the virtual switch is software-based, and a switching process may be progressed in a single thread. In that case, the concentrated traffics cannot be processed. In view of such circumstances, the virtual switch is liable to act as a bottleneck in the network process.

On the other hand, the use of the NIC offload shown in FIG. 2 enables the virtual switch to be completely bypassed. In this case, however, a packet communication path is fixed, which eliminates the merit of the flexible traffic control based on the virtual switch.

An objective of the present invention is to suppress the concentration of the traffics on the virtual switch, while achieving the flexible traffic control based on the virtual switch.

In one aspect of the present invention, a server is provided. The server includes a processor, a network adapter connected to the processor and a route switcher. The processor includes a virtual machine and a virtual switch relaying packets exchanged between the virtual machine and an exterior. The network adapter has a transfer function of transmitting and receiving packets to and from the virtual machine not through the virtual switch. The route switcher dynamically switches a flow of the packets transmitted and received by the virtual machine between first and second route pattern flows. And, the route switcher instructs the transfer function to process the first route pattern flow instructs the virtual switch to process the second route pattern flow.

In another aspect of the present invention, a non-transitory recording medium recording a flow control program to be executed by a server is provided. The flow control program which causes a server to provide a route switching function, where the server includes: a processor and a network adapter, and the processor includes a virtual machine and a virtual switch relaying packets exchanged between the virtual machine and an exterior, the network adapter having a transfer function of transmitting and receiving packets to and from the virtual machine not through the virtual switch. The route switching function dynamically switches a flow of the packets transmitted and received by the virtual machine between first and second route pattern flows. And the route switching function instructs the transfer function to process the first route pattern flow and instructs the virtual switch to process the second route pattern flow.

In still another aspect of the present invention, a network adapter is provided which is adapted to be connected to a processor of a server. The processor includes a virtual machine and a virtual switch relaying packets exchanged between the virtual machine and an exterior. The network adapter has a transfer function transmitting and receiving packets to and from the virtual machine. The network adapter includes a route switcher. The route switcher dynamically switches a flow of the packets transmitted and received by the virtual machine between first and second route pattern flows. And the route switcher instructs the transfer function to process the first route pattern flow and instructs the virtual switch to process the second route pattern flow.

The present invention enables suppressing the concentration of the traffics on a virtual switch, while achieving flexible traffic control based on the virtual switch.

BRIEF DESCRIPTION OF THE DRAWINGS

The above and other advantages and features of the present invention will be more apparent from the following description taken in conjunction with the accompanied drawings, in which:

FIG. 7 is a conceptual view showing one example of a reception filter table in one embodiment of the present invention;

FIG. 10 is a conceptual view showing one example of a transmission filter table in one embodiment of the present invention;

FIG. 12 is a conceptual view showing one example of a transmission/reception filter table in one embodiment of the present invention;

FIG. 17 is a conceptual view showing one example of a flow table in one embodiment of the present invention;

FIG. 18 is a conceptual view showing one example of a port-VM correspondence table in the embodiment of the present invention;

FIG. 25 is a conceptual view showing one example of a flow table that is referred by a branching function of the virtual machine shown in FIG. 24.

DESCRIPTION OF PREFERRED EMBODIMENTS

Preferred embodiments of the present invention will be described below with reference to the attached drawings.

1. Overall Configuration

Figure 3:
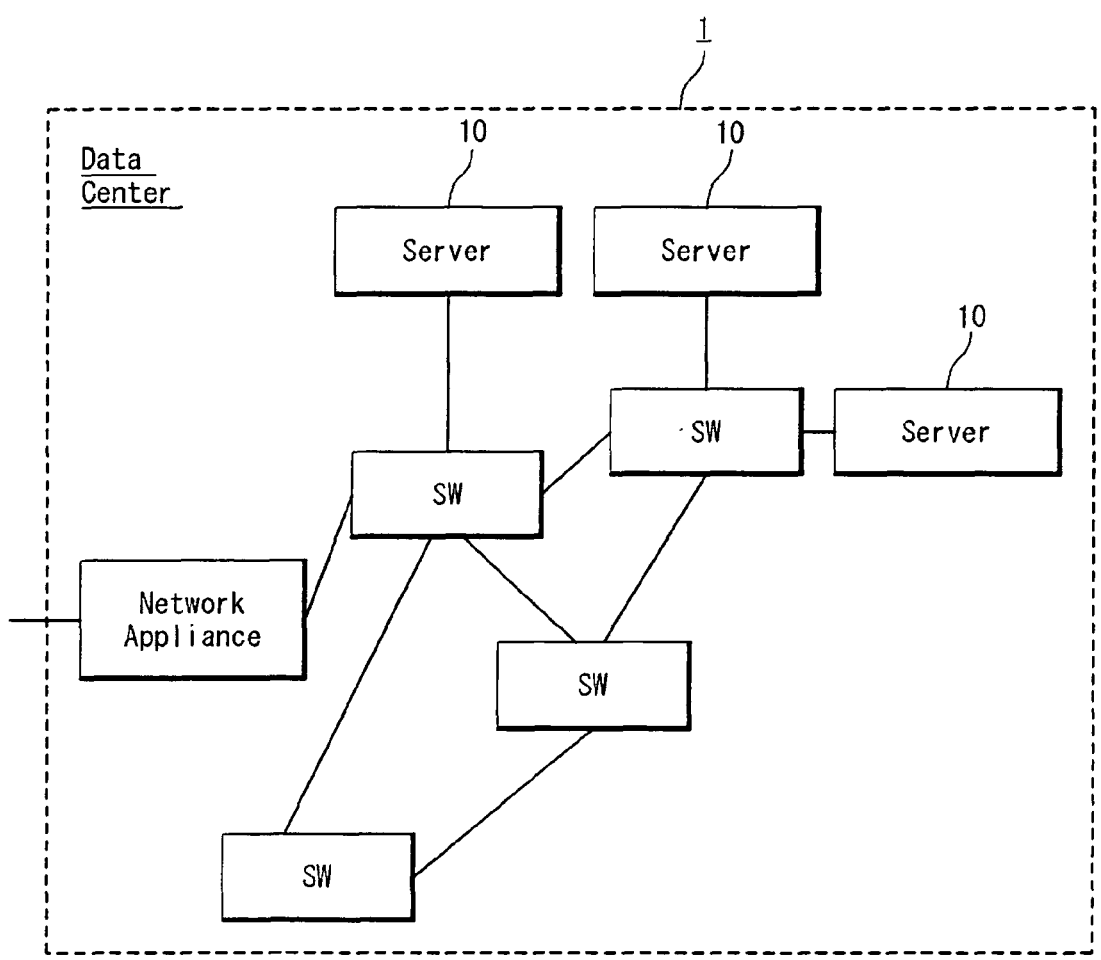
FIG. 3 is a block diagram schematically showing an exemplary configuration of a network system according to an embodiment of the present invention.

FIG. 3 is the block diagram schematically showing the configuration example of a network system 1 according to one embodiment. The network system 1 includes a plurality of servers 10 connected to a network (that is not shown). A plurality of switches are disposed among the servers 10. The network system 1 is connected to an external network through a network appliance, such as a firewall and a load balancer. The network system 1 may be the network system provided within a data center, for example.

Figure 4:
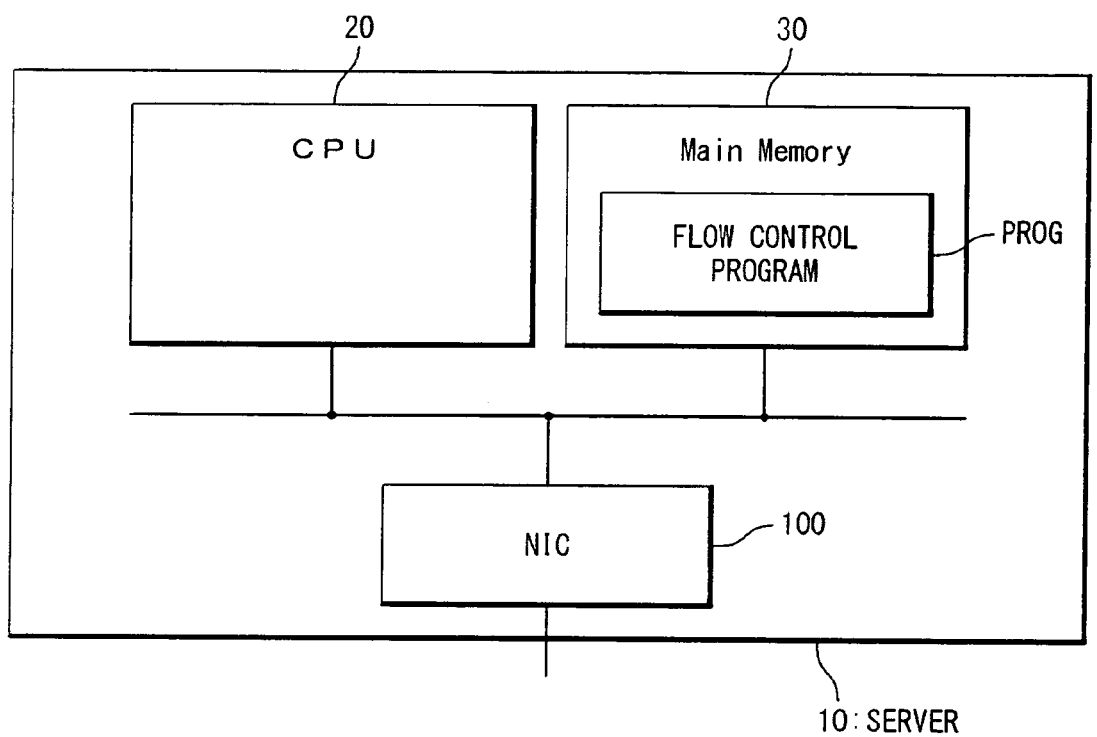
FIG. 4 is a block diagram showing an exemplary hardware configuration of a server according to an embodiment of the present invention.

FIG. 4 is the block diagram showing the hardware configuration of each server (physical server) 10 according to this embodiment. The server 10 contains a CPU (Central Processing Unit) 20, a main memory 30 and a network adaptor (network interface apparatus) 100. The network adaptor 100 may be also referred to as a network card or NIC (Network Interface Card). The CPU 20, the main memory 30 and the network adaptor 100 are connected to each other.

The main memory 30 stores virtualization software and a flow control program PROG. The virtualization software includes computer programs executed by the CPU 20, and virtual machines (VMs) and a virtual switch are established on the server 10. The flow control program PROG is a computer program executed by the CPU 20 and used to implement a "route switching function", which will be described later, in the server 10. The virtualization software and the flow control program PROG may be recorded in a non-transitory computer-readable recording medium. The flow control program PROG may be incorporated in the virtualization software.

Figure 1A:
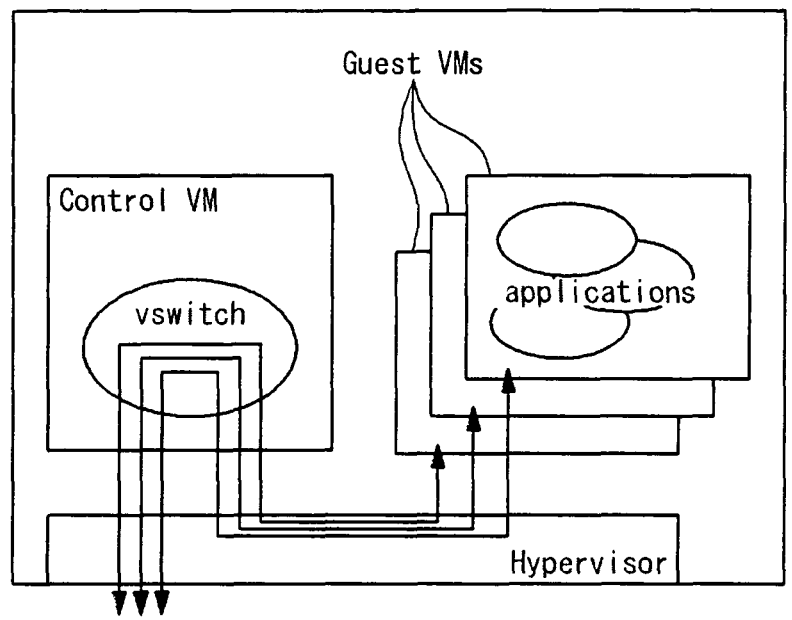
FIG. 1A is a conceptual view showing one example of the virtual switch.
Figure 1B:
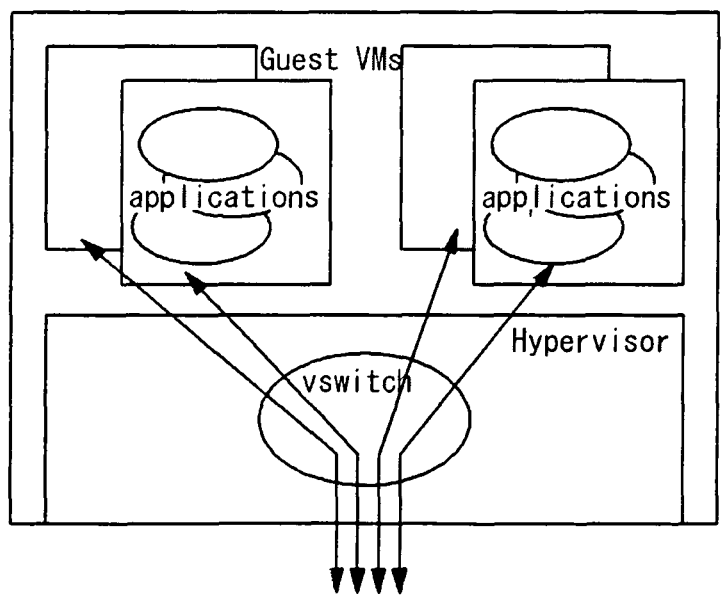
FIG. 1B is a conceptual view showing another example of the virtual switch.
Figure 2:
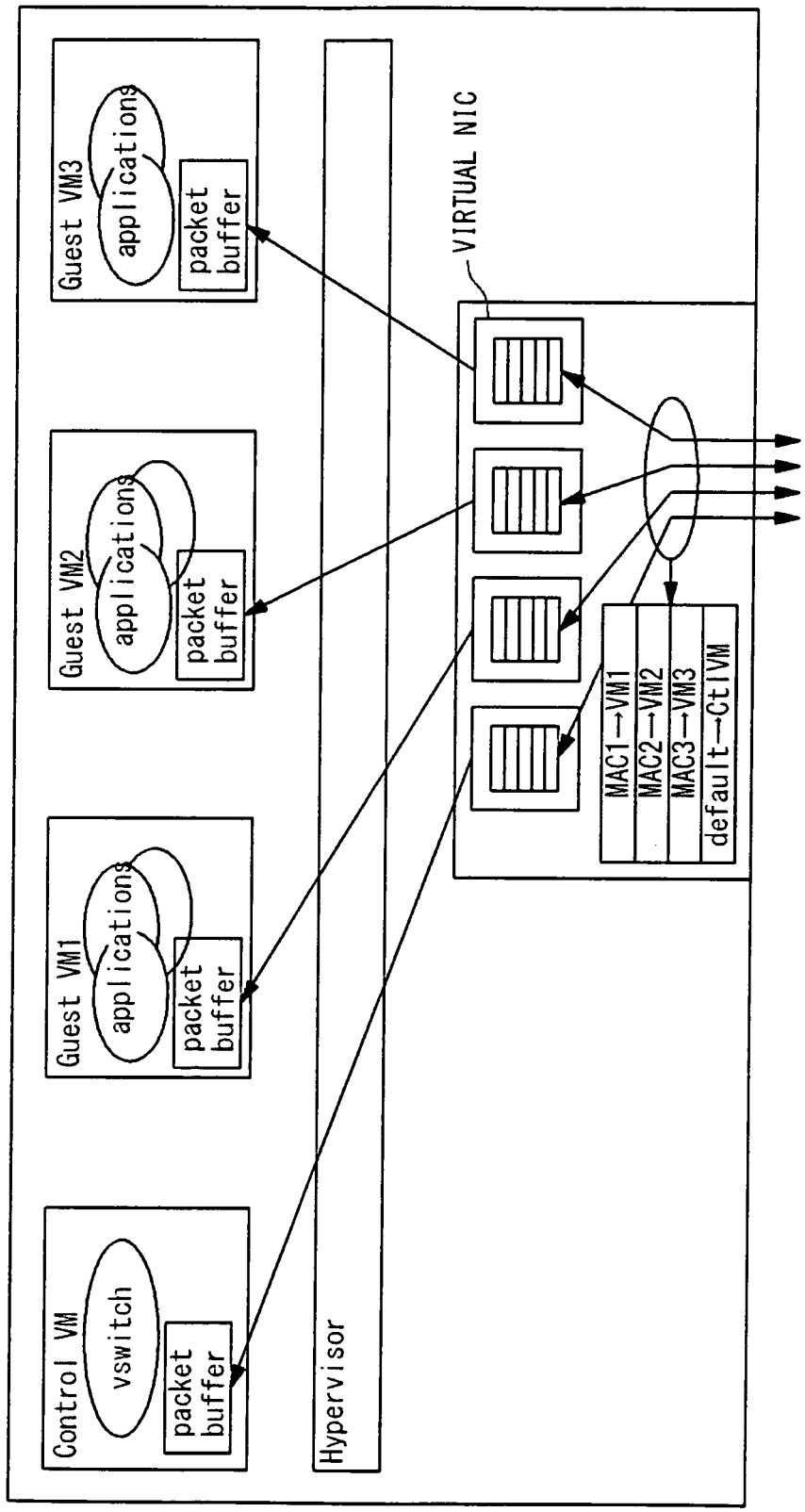
FIG. 2 is a conceptual view showing a NIC offload function.
Figure 5:
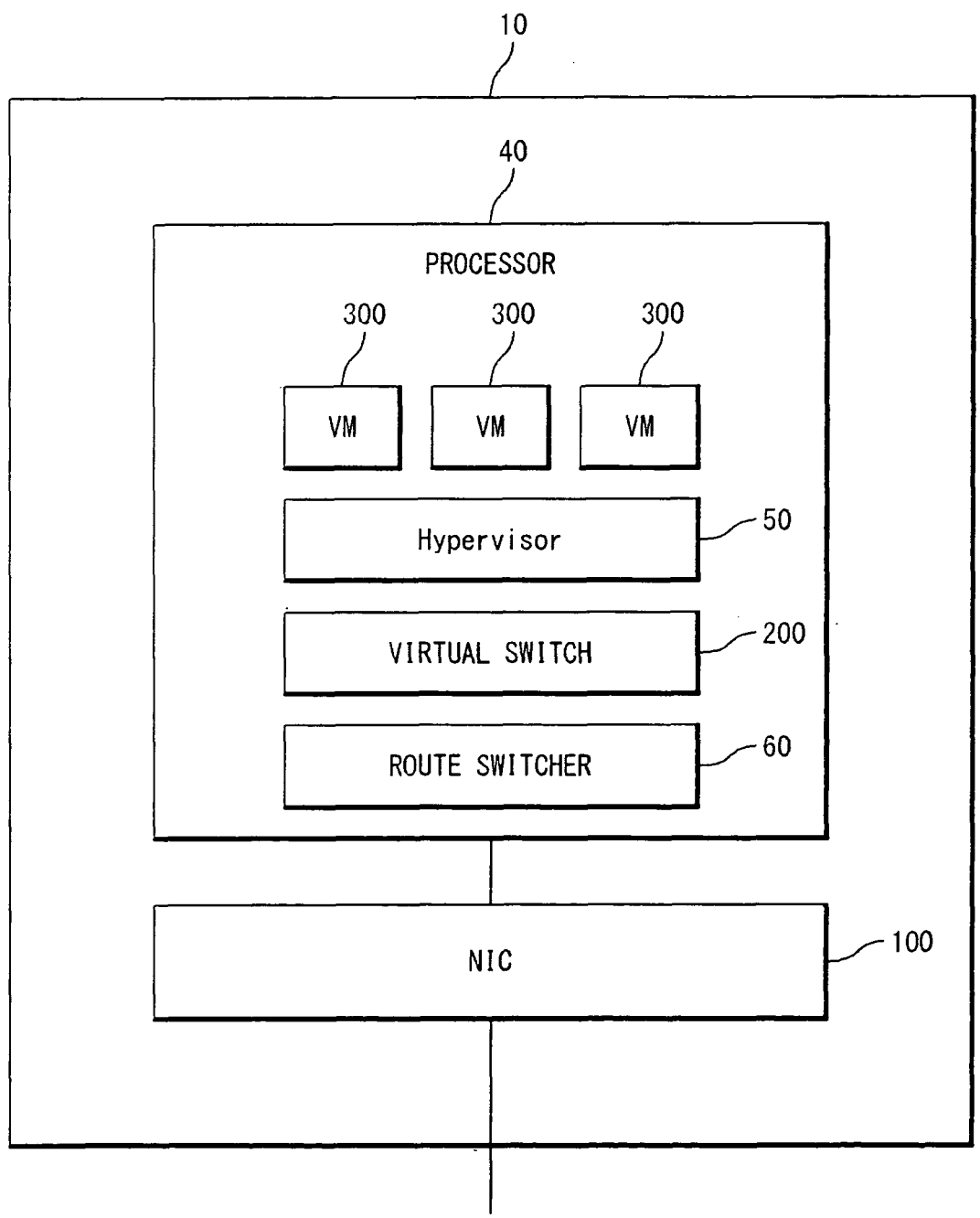
FIG. 5 is a block diagram conceptually showing an exemplary configuration of the server according to tone embodiment of the present invention.

FIG. 5 is a block diagram conceptually showing the configuration of the server 10 according to this embodiment. The server 10 includes a processor 40 and the network adaptor 100 connected to the processor 40. The processor 40 is cooperatively attained by the afore-mentioned CPU 20, the main memory 30, the virtualization software and the flow control program PROG, and provided with various functions based on a virtual environment. Specifically, the processor 40 includes a hypervisor 50, a virtual switch 200 and one or more virtual machines (virtual servers) 300. The hypervisor 50 manages the operations of the respective virtual machines 300 and also provides communication paths among the virtual machines 300. The hypervisor 50 may be also referred to as a virtual machine monitor (VMM). The virtual switch 200 relays packets transmitted from or received by the virtual machines 300, to or from the exterior. The virtual switch 200 may be operated on a control virtual machine (control VM) (refer to FIG. 1A) or may be operated on the hypervisor 50 (refer to FIG. 1B). Respective applications are run on the respective virtual machines 300 (guest VM). The control virtual machine (control VM) may be also referred to as the input/output virtual machine (IOVM).

In this embodiment, the "NIC offload" is achieved by the network adaptor 100. That is, data can be directly exchanged between the network adaptor 100 and the virtual machines 300 not through the virtual switch 200.

Figure 6:
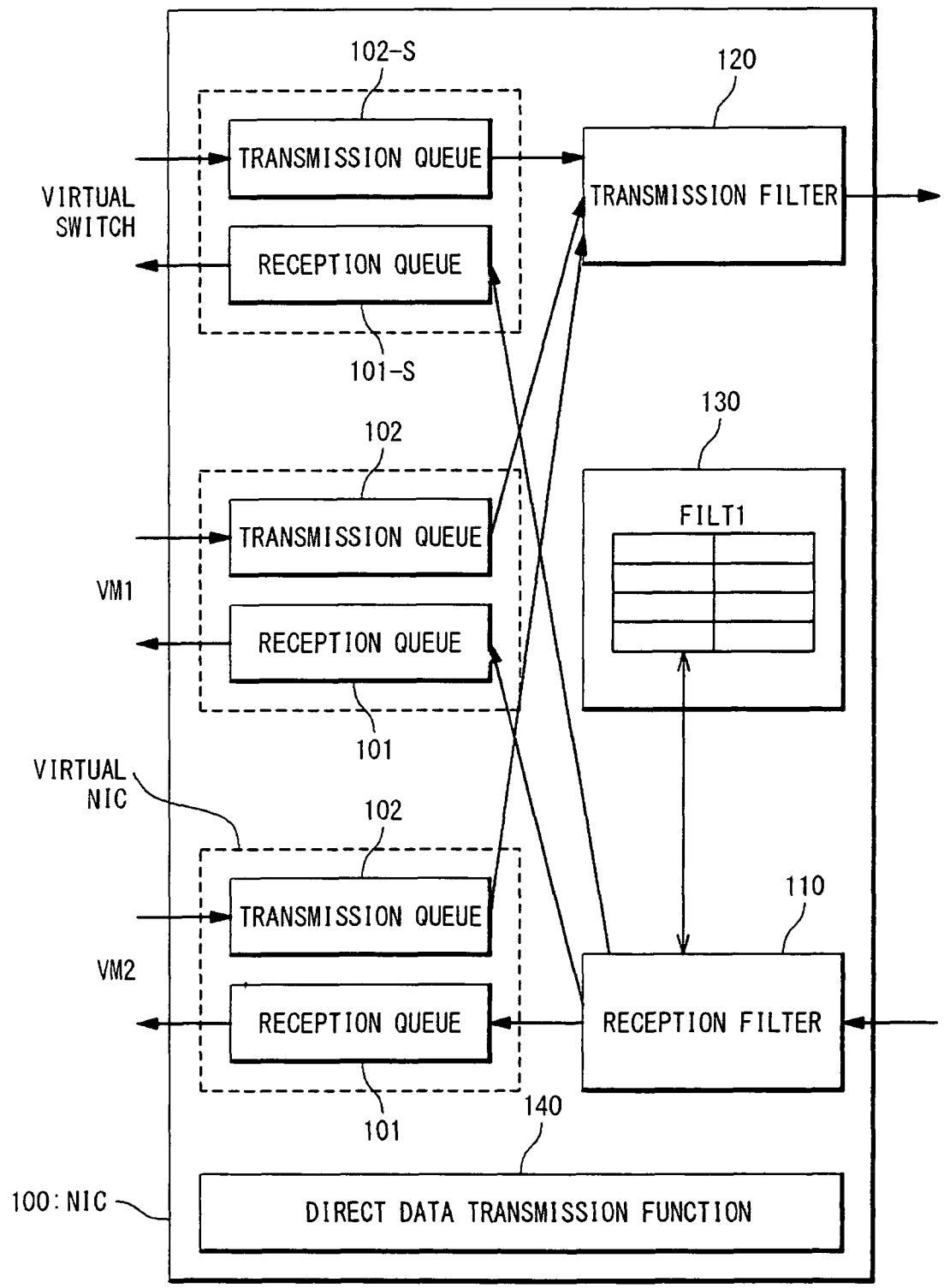
FIG. 6 is a block diagram showing an exemplary overall configuration of a network adaptor according to one embodiment of the present invention.

FIG. 6 is a block diagram showing an exemplary overall configuration of the network adaptor 100 according to this embodiment. The network adaptor 100 includes virtual NICs (indicated with dashed line frames in FIG. 6), a reception filter 110, a transmission filter 120, a storage unit 130 and a direct data transfer function 140. The direct data transfer function 140 is the function of directly transmitting or receiving packets to or from the virtual machines 300 not through the virtual switch 200. In detail, the direct data transfer function 140 directly transfers data between transmission/reception queues of the network adaptor 100 and the address space used by the virtual machines 300.

The virtual NICs are respectively prepared for the virtual machines 300 (VM1, VM2, - - - ). Each virtual NIC includes a reception queue 101 and a transmission queue 102. The reception queue 101 stores reception packets are received by the network adaptor 100 from a data link. The reception packets stored in the reception queue 101 are directly transmitted to the corresponding virtual machine 300 by the direct data transfer function 140. Also, transmission packets which are directly received by the network adaptor 100 by using the direct data transfer function 140 from a virtual machine are stored in the transmission queue 102 corresponding to the virtual machine.

Also, another virtual NIC is prepared for the virtual switch 200. The reception queue 101 and the transmission queue 102 in the virtual NIC connected to the virtual switch 200 are hereinafter referred to as reception queue 101-S and transmission queue 102-S, respectively. The reception queue 101-S stores reception packets received by the network adaptor 100 from the external data link. The reception packets stored in the reception queue 101-S are transmitted to the virtual switch 200. Also, transmission packets received by the network adaptor 100 from the virtual switch 200 are stored in the transmission queue 102-S.

The transmission filter 120 selects the transmission queues 102 and 102-S in a predetermined order or at a predetermined timing. The transmission filter 120 then extracts transmission packets from the selected transmission queue 102 or 102-S and transmits the transmission packets to the data link. It should be noted that the transmission queues 102 may store only meta data of packets, such as addresses of the virtual machines 300 storing the packets, instead of original data of the packets. In this case, the transmission filter 120, upon selection of the transmission queue 102 from which packets are to be next extracted, instructs the direct data transfer function 140 to transfer the packets from the virtual machines 300 by using the meta data of the packets stored in the corresponding queue.

The reception filter 110 receives reception packets from the data link. The reception filter 110 selects a reception queue 101 or 101-S in which the reception packets are to be stored. A reception filer table FILT1 is used for this selection. The reception filer table FILT1 is stored in the storage unit 130. Examples of the storage unit 130 include a DRAM, a SRAM, a content addressable memory (CAM) and the like.

The reception filer table FILT1 is a table showing the relation between flows and receiving actions. The reception filter 110 refers to the reception filer table FILT1 to perform the receiving action correlated to the reception packet flow on the reception packets. Two receiving actions are available in this embodiment. A first receiving action is to directly transmit the reception packets to the specified virtual machine 300 by using the direct data transfer function 140. In this case, the reception filter 110 stores the reception packets in the specified reception queue 101. A second receiving action is to transmit the reception packets to the virtual switch 200. In this case, the reception filter 110 stores the reception packets in the reception queue 101-S associated with the virtual switch 200.

FIG. 7 shows one example of the reception filter table FILT1. The reception filter table FILT1 has a plurality of filter entries. Each filter entry indicates a key to identify the flow and the receiving action to be performed on the reception packets of the corresponding flow. The key is the flow identification information and composed of a combination of predetermined protocol header fields in header information of the reception packets. This key is similar to the key in a flow table of, for example, OpenFlowSwitch (refer to http://www.openflowswitch.org/). The receiving action indicates the reception queue in which the reception packets are to be stored. For example, "receiving action: VM1", which implies the reception queue 101 associated with the virtual machine VM1, corresponds to the afore-mentioned first receiving action. Also, "receiving action: vswitch", which implies the reception queue 101-S associated with the virtual switch 200, corresponds to the afore-mentioned second receiving action.

Upon receiving a reception packet, the reception filter 110 retrieves an exact match entry in the reception filter table FILT1 by using the header information of the reception packet. If there is an exact match entry matching with the flow of the reception packet, the reception queue 101 performs the first receiving action, which is specified by the exact match entry, on the reception packet. In the example of FIG. 7, for example, the reception filter 110 stores a reception packet which belongs to the flow "flow1" in the reception queue 101 associated with the virtual machine VM1. On the other hand, if there is no exact match entry matching with the flow of the reception packet, the reception filter 110 performs the second receiving action on the reception packet. That is, the reception packet is stored in the reception queue 101-S associated with the virtual switch 200. Such operation provides the NIC offload.

Figure 8:
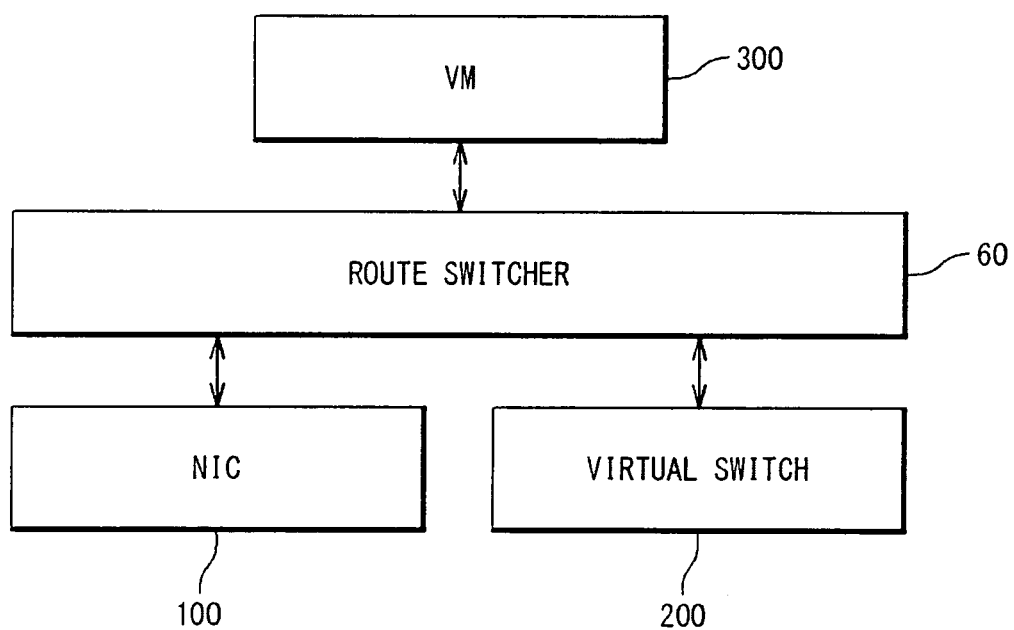
FIG. 8 is a schematic view showing a function of a route switcher according to one embodiment of the present invention.

The server 10 of this embodiment further includes a route switcher 60. FIG. 8 is the schematic view showing the function of the route switcher 60 according to this embodiment. In this embodiment, the route switcher 60 "dynamically" switches the transmission routes of the packets which are transmitted or received by the virtual machines 300.

In detail, two patterns are available as the transmission routes of packets transmitted or received by the virtual machines 300. In the first route pattern, packets are directly exchanged between the network adaptor 100 and the virtual machines 300 by using the direct data transfer function 140 in the network adaptor 100 as mentioned above (NIC offload), not through the virtual switch 200. In the second route pattern, on the other hand, packets are transmitted to or received from the virtual machines 300 through at least the virtual switch 200. The flows of the first and second route patterns are hereinafter referred to as "first route pattern flow" and "second route pattern flow", respectively.

The route switcher 60 sets the flow route of packets transmitted and received by the virtual machine 300 to one of the first and second route patterns. Moreover, the route switcher 60 dynamically switches the route setting on the basis of predetermined conditions. That is, the route switcher 60 dynamically switches (or configures) the flow of packets transmitted or received by the virtual machine 300 to the first route pattern flow or second route pattern flow. The route switcher 60 then instructs the direct data transfer function 140 in the network adaptor 100 to provide the first route pattern flow, and instructs the virtual switch 200 to provide process the second route pattern flow.

As thus discussed, all of the flows do not always fixedly bypass the virtual switch 200 in this embodiment. The NIC offload is performed on only desired flows (the first route pattern flows) to bypass the virtual switch 200. The remaining flows (the second route pattern flows) pass through the virtual switch 200 as in a usual operation. This effectively suppresses the concentration of the traffics on the virtual switch 200, while providing a flexible traffic control based on the virtual switch 200.

It should be noted that the route switcher 60 is achieved by executing the flow control program PROG on the server 10 (CPU 20). The route switcher 60 may be incorporated in the processor 40 as shown in FIG. 5. Instead, the route switcher 60 may be incorporated in the network adaptor 100 (which will be later described in section 3-3). Typically, the route switcher 60 is incorporated in the virtual switch 200 or hypervisor 50 in the processor 40; it should be noted that the present invention is not limited to such a configuration.

In the following, a detailed description is given of the route switching process according to this embodiment.

2. Example of Route Switching Process

Figure 9:
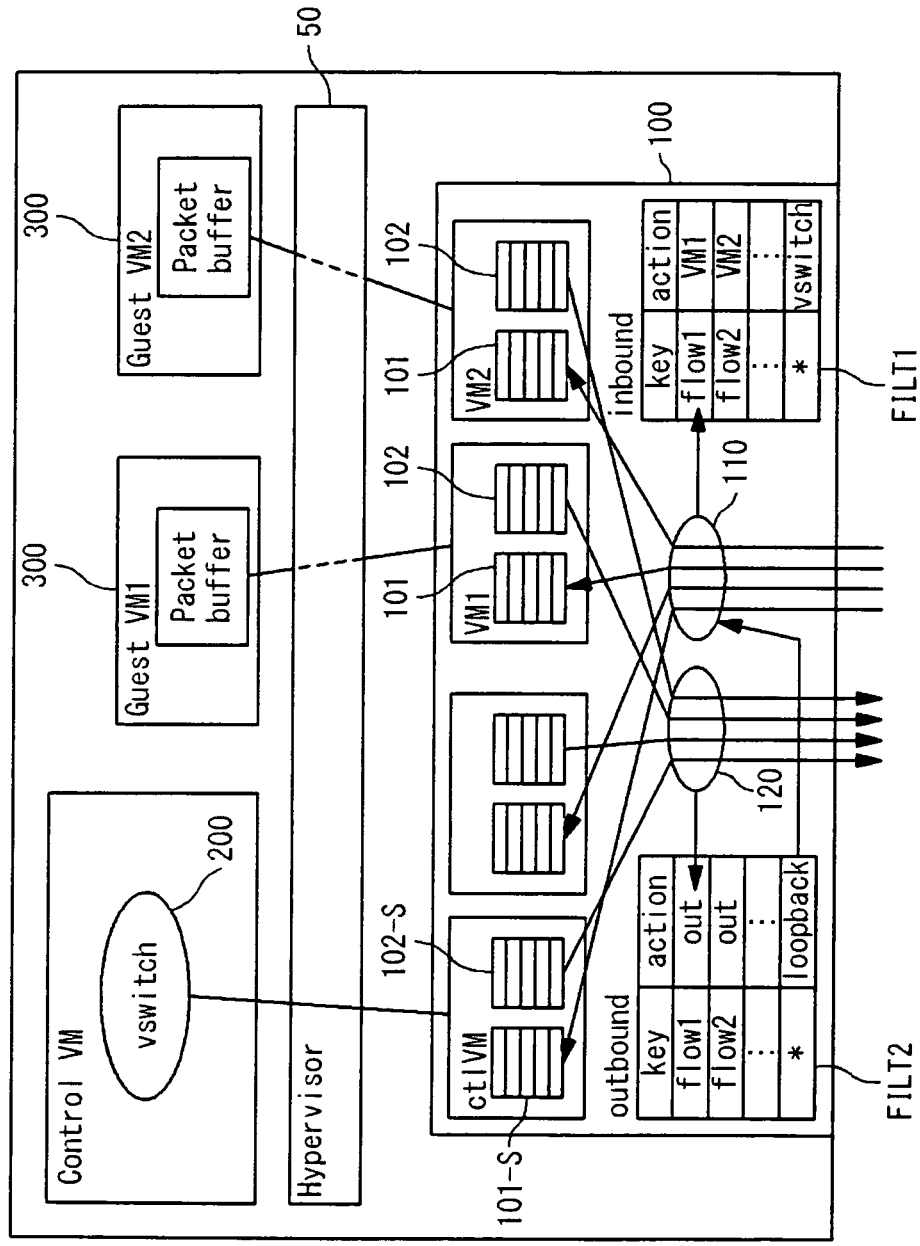
FIG. 9 is a conceptual view showing one example of a route switching process according to one embodiment of the present invention.

FIG. 9 is a conceptual view showing one example of the route switching process according to this embodiment. In this processing example, the network adaptor 100 is provided with a transmission filter table FILT2 as well as the reception filter table FILT1. Similarly to the reception filter table FILT1, the transmission filter table FILT2 is also stored in the storage unit 130. It should be noted that the reception filter table FILT1 and the transmission filter table FILT2 may be collectively referred to as "filter table FILT".

2-1. Transmission Filter Table

The transmission filter table FILT2 indicates the relation between the flows and transmitting actions. The transmission filter 120 refers to the transmission filter table FILT2 to perform the transmitting action correlated to the flow on transmission packets. Two patterns are available as the transmitting actions. A first transmitting action is to transmit transmission packets to the external data link. In this case, the transmission filter 120 transmits transmission packets to the data link. The second transmitting action is to loop back transmission packets as reception packets to the reception filter 110 (that is, the reception route). In this case, the transmission filter 120 loops back transmission packets as reception packets to the reception filter 110.

FIG. 10 shows one example of the transmission filter table FILT2. The transmission filter table FILT2 has a plurality of filter entries. Each filter entry indicates the key to identify the flow and the transmitting action to be performed on transmission packets of the corresponding flow. The key is the flow identification information, and composed of a combination of predetermined protocol header fields in header information of the transmission packets. This key is similar to the key in the flow table of, for example, OpenFlowSwitch (refer to http://www.openflowswitch.org/). The transmitting action indicates a first transmitting action "out" or second transmitting action "loopback".

Upon extracting a transmission packet from the selected transmission queue 102, the transmission filter 120 retrieves an exact match entry in the transmission filter table FILT2 by using the header information of the transmission packet. If there is an exact match entry matching with the flow of the transmission packet, the transmission filter 120 performs the first transmitting action (out) on the transmission packet as specified by the exact match entry. That is, the transmission packet is transmitted to the data link. On the other hand, if there is no exact match entry matching with the transmission packet, the transmission filter 120 performs the second transmitting action (loopback) on the transmission packet. That is, the transmission packet is looped back as a reception packet to the reception filter 110 (that is, the reception route).

Figure 11:
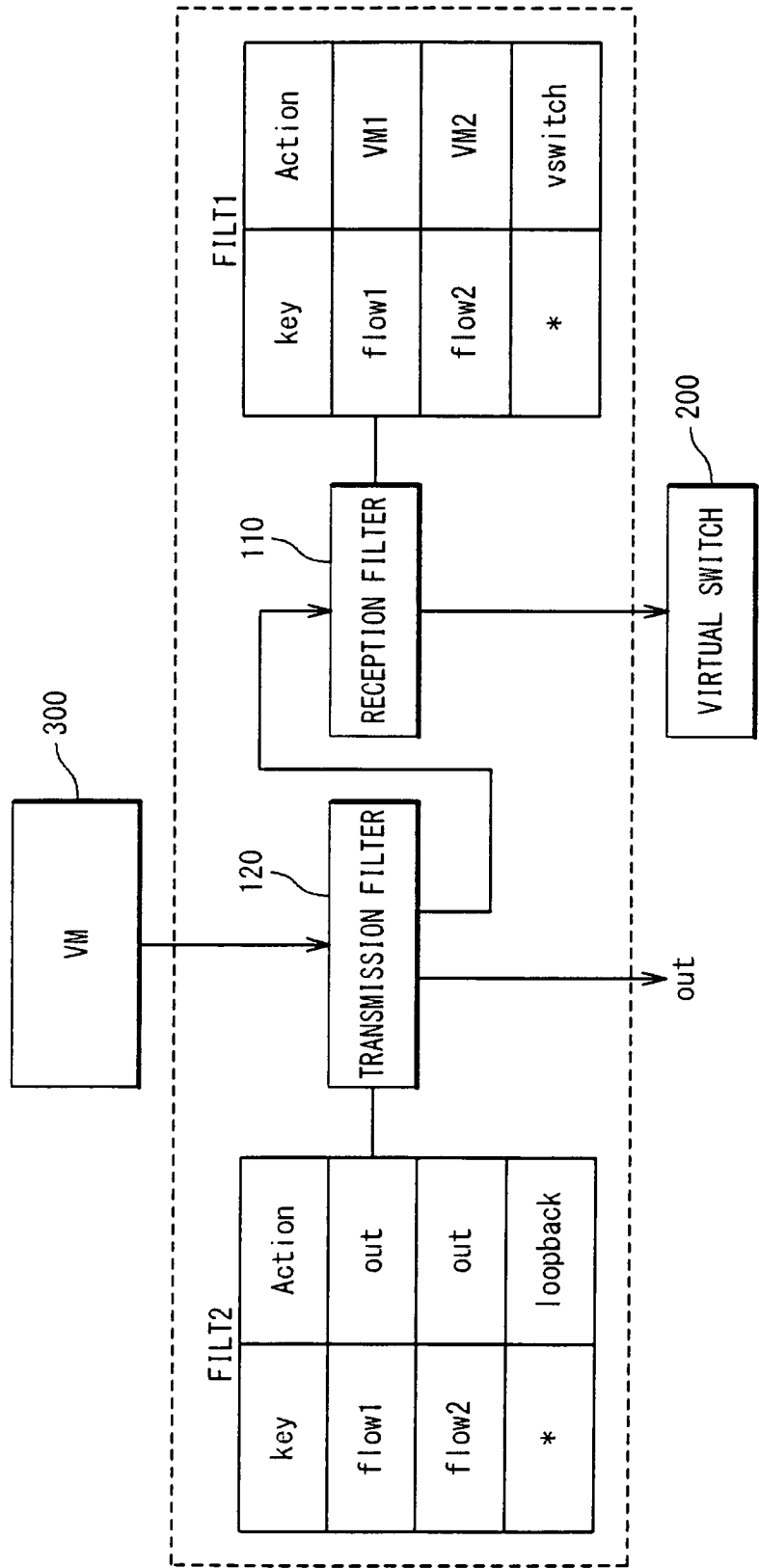
FIG. 11 is a conceptual view showing two route patterns in one embodiment of the present invention.

The two route patterns will be described below with reference to FIG. 9 and FIG. 11. In the examples of FIGS. 9 and 11, only the flows "flow1" and "flow2" are correlated to the first receiving action in the reception filter table FILT1, and the other flows are correlated to the second receiving action. Also, only the flows "flow1" and "flow2" are correlated to the first transmitting action in the transmission filter table FILT2, and the other flows are correlated to the second transmitting action.

In this processing example, a transmission packet transmitted from the virtual machine 300 is firstly inputted to the network adaptor 100. At this time, the transmission packet is directly inputted to the network adaptor 100 by using the direct data transfer function 140 in the network adaptor 100 not through the virtual switch 200. The transmission filter 120 extracts the transmission packet from the selected transmission queue 102.

If the transmission packet belongs to the flow "flow1" or "flow2", an exact match entry is hit in the transmission filter table FILT2. Accordingly, the transmission filter 120 transmits the transmission packet to the data link. That is, the transmission packet is transmitted from the virtual machine 300 through the network adaptor 100 to the exterior without passing through the virtual switch 200. This corresponds to the first route pattern.

If the transmission packet belongs to a different flow, on the other hand, no exact match entry is hit in the transmission filter table FILT2. Accordingly, the transmission filter 120 loops back the transmission packet as a reception packet to the reception filter 110. No exact match entry is hit also in the reception filter table FILT1. Hence, the reception filter 110 transmits the reception packet to the virtual switch 200 through the reception queue 101-S. In other words, the packet is once inputted to the network adaptor 100 and then processed by the virtual switch 200. This corresponds to the second route pattern.

A reception packet received from the data link is processed as follows. If the reception packet belongs to the flow "flow1" or "flow2", an exact match entry is hit in the reception filter table FILT1. Accordingly, the reception filter 110 stores the reception packet in the reception queue 101 associated with to the corresponding virtual machine 300. The reception packet is directly transmitted to the corresponding virtual machine 300 by using the direct data transfer function 140 not through the virtual switch 200. This corresponds to the first route pattern.

If the reception packet belongs to a different flow, on the other hand, no exact match entry is hit in the reception filter table FILT1. Accordingly, the reception filter 110 stores the reception packet in the reception queue 101-S associated with the virtual switch 200. Hence, the reception packet is processed by the virtual switch 200. This corresponds to the second route pattern.

It should be noted that the reception filter table FILT1 and the transmission filter table FILT2 may be combined and provided as a single transmission/reception filter table, as shown in FIG. 12. In the example of FIG. 12, the second receiving action and the second transmitting action commonly involves storing the packet in the reception queue 101-S associated with the virtual switch 200, as indicated by the notation "vswitch". This also achieves the loop-back of the transmission packet to the reception route.

2-2. Route Switcher 60

As mentioned above, in accordance with the entry settings in the reception filter table FILT1 and the transmission filter table FILT2, the flow route of a packet transmitted or received by the virtual machine 300 is set to the first route pattern or second route pattern. In addition, the flow route can be "dynamically" switched by modifying the entry settings in the reception filter table FILT1 and the transmission filter table FILT2. The route switcher 60 carries out such entry settings and modification of the settings.

Specifically, the route switcher 60 assigns the flows of packets transmitted or received by the virtual machine 300 to the first route pattern flow or second route pattern flow in accordance with a predetermined standard. The assignment can be dynamically modified. The route switcher 60 sets the reception filter table FILT1 so that the first route pattern flow is correlated to the first receiving action and the second route pattern flow is correlated to the second receiving action. Also, the route switcher 60 sets the transmission filter table FILT2 so that the first route pattern flow is correlated to the first transmitting action and the second route pattern flow is correlated to the second transmitting action. As a result, the first route pattern flow is processed not through the virtual switch 200, namely, the NIC-offload is performed on the first route pattern flow. On the other hand, the second route pattern flow is processed by the virtual switch 200.

It should be noted that the filter entries associated with the same flow may be set in only one of the reception filter table FILT1 and the transmission filter table FILT2. In that case, the route pattern becomes asymmetric between the receiving side and the transmitting side. As one example, let us consider a case in which the filter entry associated with the flow "flow1" is set only in the transmission filter table FILT2 in FIG. 9 and FIG. 11 as mentioned above. In that case, with regard to the flow "flow1", the transmission route of a transmission packet is set to the first route pattern in which the transmission packet does not pass through the virtual switch 200, and the transmission route of a reception packet is set to the second route pattern in which the reception packet passes through the virtual switch 200.

Figure 13:
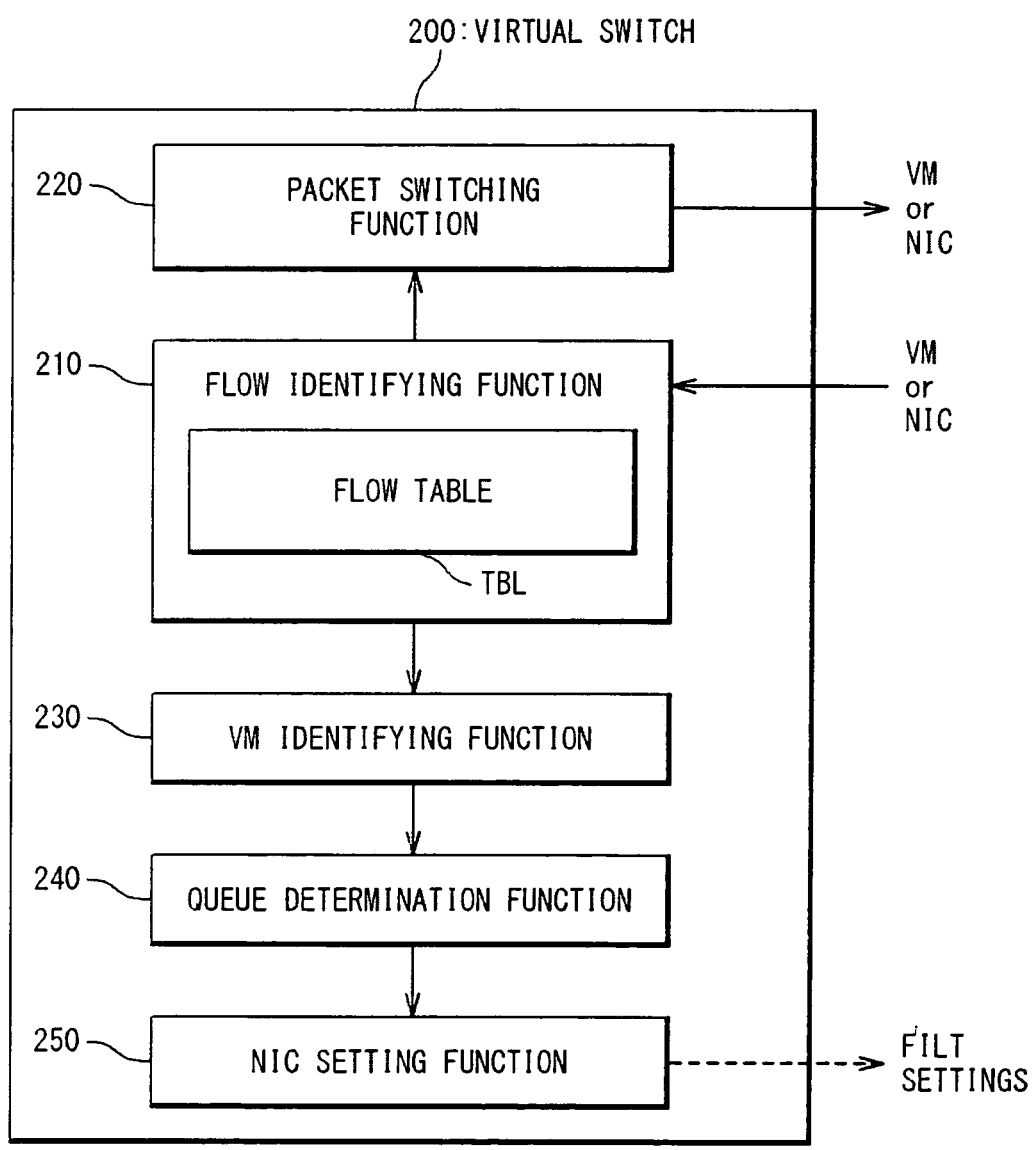
FIG. 13 is a block diagram showing a configuration example of the virtual switch according to one embodiment of the present invention.

The route switcher 60 is incorporated in, for example, the virtual switch 200. FIG. 13 is the block diagram showing an exemplary function configuration of the virtual switch 200 in that case. The virtual switch 200 is provided with a flow identifying function 210, a packet switching function 220, a VM identifying function 230, a queue determination function 240 and an NIC setting function 250.

The virtual switch 200 receives packets from the network adaptor 100 and the virtual machines 300. The flow identifying function 210 identifies the flow to which each received packet belongs on the basis of the header information of the received packet. Also, the flow identifying function 210 refers to a flow table TBL that indicates a relation between the flow identification information (Key) and the actions (Action) to obtain the action to be performed on the packet. The packet switching function 220 processes the packet in accordance with the action. Typically, the action of the flow table TBL describes the output port (transfer destination) of the packet. The packet switching function 220 outputs the packet from the output port specified by the action. The outputted packet is transmitted to the network adaptor 100 or virtual machine 300.

It should be noted that, if there is no filter entry matching with the packet in the flow table TBL, the flow identifying function 210 performs a predetermined process on the packet. For example, the flow identifying function 210 transfers the packet to an open flow controller (OFC) and requests the route setting.

The VM identifying function 230 specifies a virtual machine 300 by which packets that belongs to a specified flow are to be transmitted or received. Here, the "specified flow" implies the flow on which the entry setting in the filter table FILT is desired to be performed on the network adaptor 100. The queue determination function 240 determines the transmission/reception queues (101, 102) correlated to the virtual machine 300 specified by the VM identifying function 230. The NIC setting function 250 prepares a filter entry to be set for the filter table FILT by properly referring to the transmission/reception queue. The NIC setting function 250 then informs the prepared filter entry of the network adaptor 100, and then sets or modifies the filter table FILT.

The route switcher 60 contains the afore-mentioned VM identifying function 230, queue determination function 240 and NIC setting function 250.

2-3. Cache Control

The cache control of the filter table FILT may be also implemented. This is preferable for a case in which only a relatively small storage unit 130 can be mounted in the network adaptor 100. The cache control will be described below with reference to FIG. 14.

Figure 14:
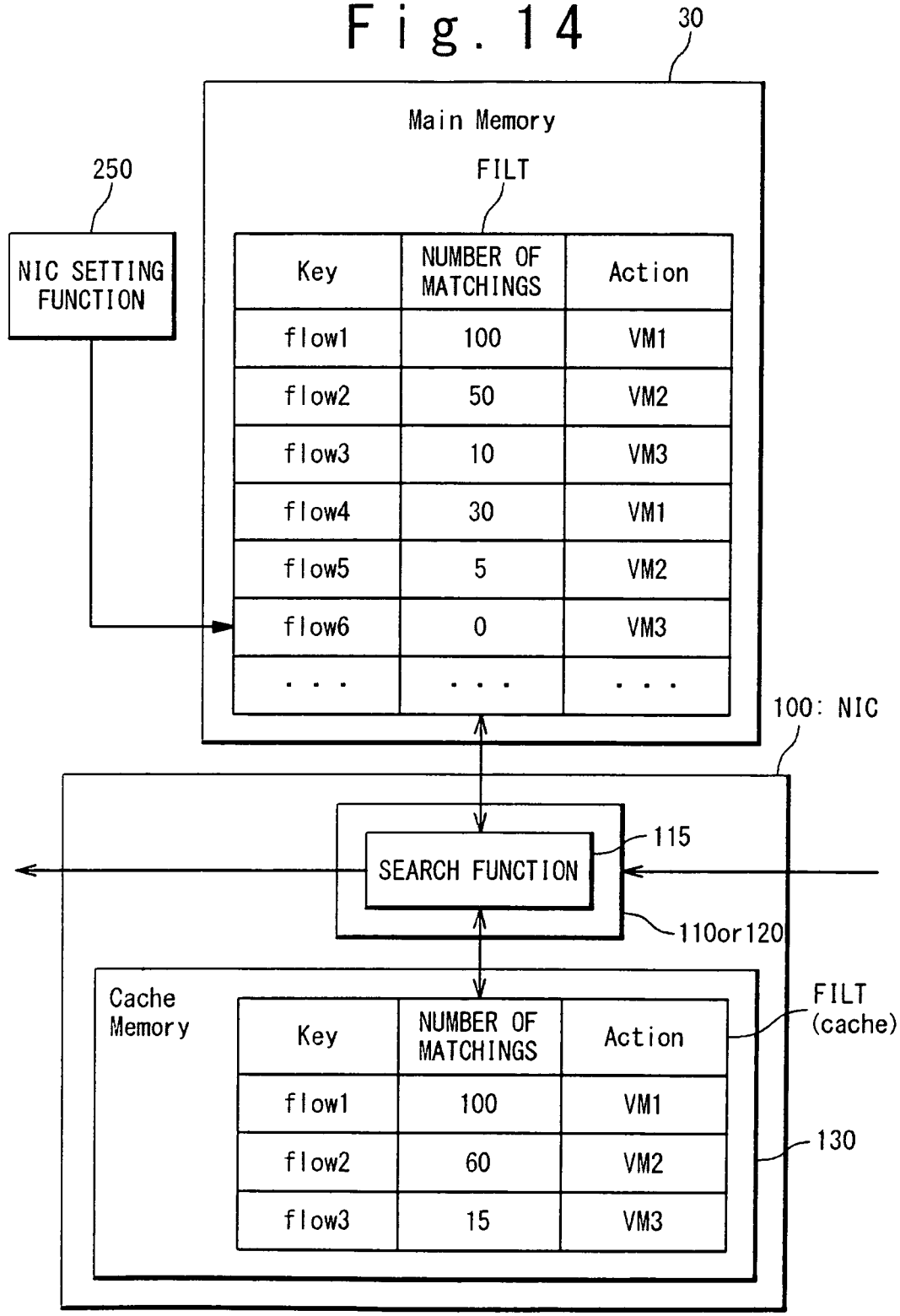
FIG. 14 is a conceptual view showing a cache control in one embodiment of the present invention.

As shown in FIG. 14, the main body of the filter table FILT is stored in the main memory 30 (refer to FIG. 4) in the server 10. The NIC setting function 250 (or the route switcher 60) sets or modifies the filter table FILT on the main memory 30.

The storage unit 130 in the network adaptor 100 is a cache memory of a relatively small capacity (for example, several tens of kilo bytes). The filter table FILT (cache) cached in the cache memory 130 is a part of the filter table FILT stored in the main memory 30.

Each of the reception filter 110 and the transmission filter 120 in the network adaptor 100 is provided with a retrieving function 115. When receiving a packet, the retrieving function 115 firstly examines the entries cached in the cache memory 130. When this results in a cache hit, the retrieving function 115 processes the packet as mentioned above, in accordance with the hit entry. When a cache miss occurs, on the other hand, the retrieving function 115 accesses the main memory 30 and searches the main body of the filter table FILT to obtain necessary entries. The retrieving function 115 then stores the obtained entries in the cache memory 130 and processes the packet in accordance with the entries. If there is no empty entry, the retrieving function 115 also carries out the exchange of the cache entries.

It should be noted that each entry of the filter table FILT may include statistic information that is updated each time a packet is processed. In the example of FIG. 14, each entry includes the number of matchings for the entry. The retrieving function 115 writes back the statistical information from the cache memory 130 to the main memory 30 at a predetermined timing. The predetermined timing may be a timing at which the route switcher 60 requires the statistical information, a timing at which the entry is removed from the cache memory 130, or the like.

3. Variations of Embodiments

As mentioned above, the first route pattern flow is processed not through the virtual switch 200, namely, the NIC-offload is performed on the first route pattern flow. This NIC offload suppresses the concentration of the traffics on the virtual switch 200. There are various candidates of the first route pattern flow for which the NIC offload is to be performed. Also, there are various allowed setting timings of the NIC offload. Several embodiments will be described below.

3-1. First Embodiment

In a first embodiment, the first route pattern flow, for which the NIC offload is to be performed, is the "overload flow" in which the load exceeds a predetermined threshold. On the other hand, the second route pattern flow is the "usual load flow" in which the load is equal to or less than the predetermined threshold. The start timing of the NIC offload is a timing at which a certain flow becomes the overload flow from the usual load flow, and the finish timing of the NIC offload is a timing when the certain flow returns to the usual load flow from the overload flow.

To achieve this, the route switcher 60 measures the load for each flow on the basis of packets transmitted or received by the virtual machine 300. The route switcher 60 compares the measured load with the predetermined threshold, and determines whether each flow is the usual load flow or overload flow. When a certain flow becomes the overload flow from the usual load flow, the route switcher 60 switches the overload flow to the first route pattern flow. As a result, the NIC-offload is performed on the overload flow to bypass the virtual switch 200. Also, when the certain flow returns to the usual load flow from the overload flow, the route switcher 60 returns the flow from the first route pattern flow to the second route pattern flow. As a result, the flow is processed by the virtual switch 200 from then on.

In this way, in the first embodiment, the NIC-offload is performed only on the overload flow. This efficiently reduces the traffic concentration on the virtual switch 200. Also, the number of the entries set for the filter table FILT is relatively small. Hence, the first embodiment is available even when only a relatively small storage unit 130 can be incorporated in the network adaptor 100. It should be noted that, when the loads are uneven between the transmitting side and the receiving side, the route pattern may be made asymmetric between the transmitting side and receiving side.

In the following, a description is given of an example of the specific configuration and operation according to the first embodiment. In this example, the route switcher 60 is incorporated in the virtual switch 200.

Figure 15:
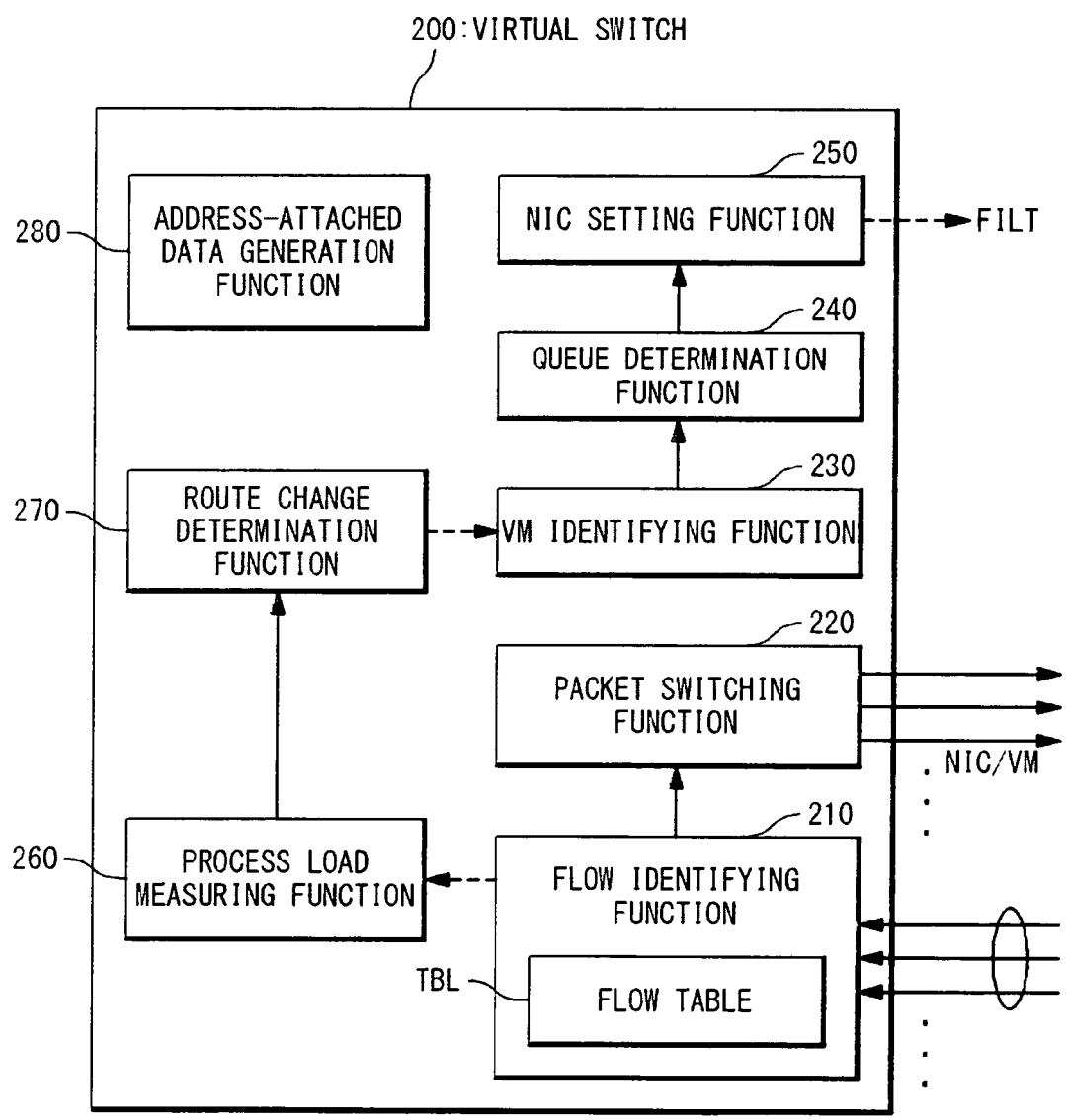
FIG. 15 is a block diagram showing a configuration of a virtual switch according to a first embodiment of the present invention.

FIG. 15 is the block diagram showing the configuration of the virtual switch 200 in the first embodiment. In the first embodiment, the virtual switch 200 is further provided with a process load measuring function 260, a route change determination function 270 and an address-attached data generation function 280, in addition to the configuration shown in FIG. 13 as mentioned above. The process load measuring function 260 samples the transmission and reception packets at a predetermined frequency and measures the load for each flow (the packet processing quantity and the processing load) on the basis of the transmission and reception packets. Also, the process load measuring function 260 holds load information indicating the measurement result. The route change determination function 270 determines whether each flow is the overload flow (first route pattern flow) or the usual load flow (second route pattern flow) by referring to the load information. That is, the route change determination function 270 dynamically changes the belongings of the first route pattern flow and the second route pattern flow, in accordance with the load information. Then, the route change determination function 270 specifies the flow(s) for which the route pattern should be changed, for the VM identifying function 230. The address-attached data generation function 280 will be described later.

Figure 16:
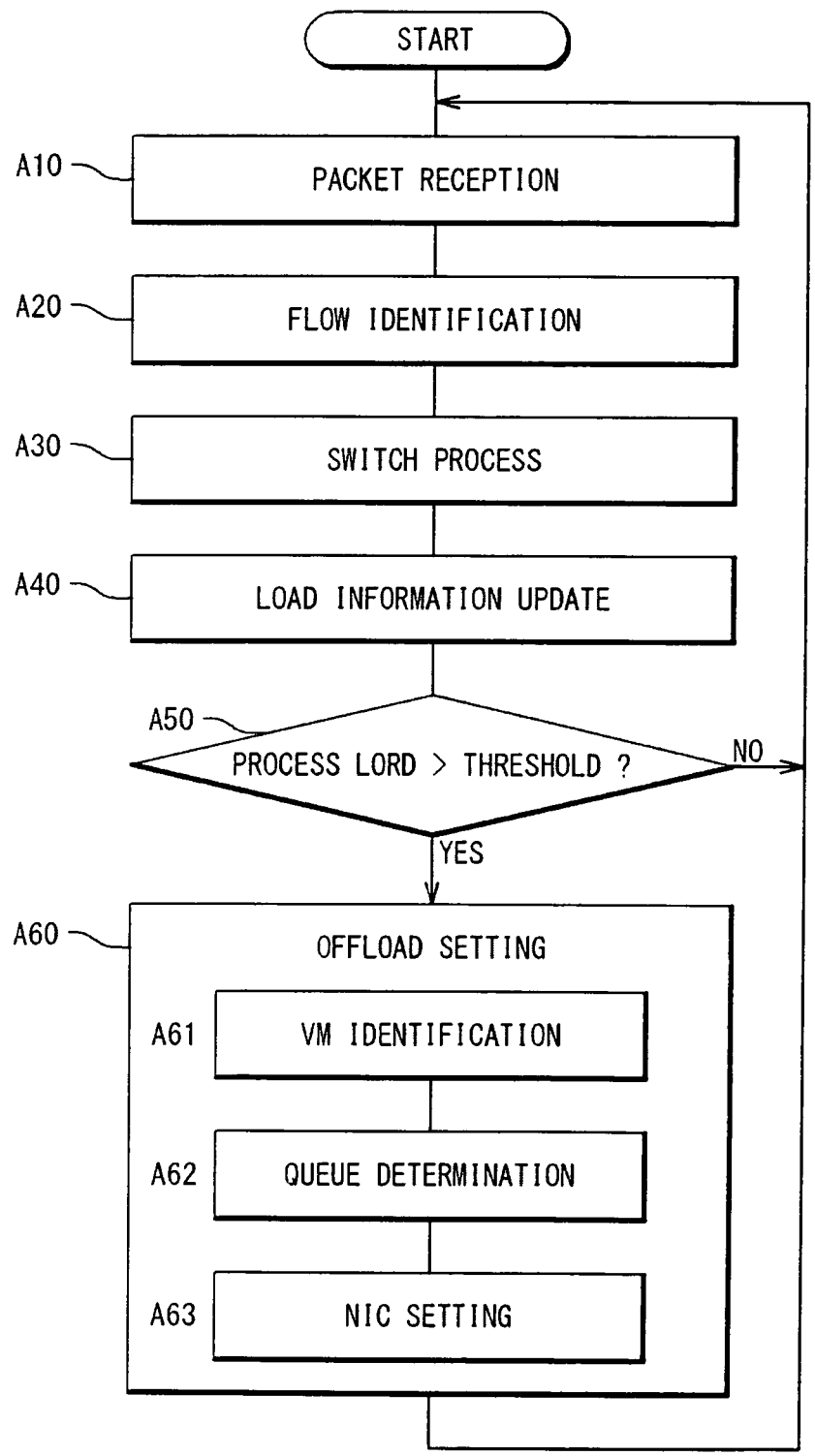
FIG. 16 is a flowchart showing a process in the first embodiment.

FIG. 16 is the flowchart showing an exemplary processing in the first embodiment. At first, the virtual switch 200 receives a packet from the network adaptor 100 or a virtual machine 300 (Step A10). The flow identifying function 210 identifies the flow to which the packet belongs, in accordance with the header information of the received packet. Also, the flow identifying function 210 refers to the flow table TBL and obtains the action that should be performed on the packet (Step A20).

FIG. 17 shows one example of the flow table TBL. The flow table TBL has a plurality of table entries. Each table entry indicates: the key for identifying each flow, and the action performed on the packet of the flow. The key is the flow identification information and composed of a combination of predetermined protocol header fields in the header information of the packet. The action typically indicates the output port (transfer destination) of the packet. Such flow table TBL is stored in a predetermined storage device (typically, the main memory 30). Also, in the example of FIG. 17, each table entry has a flag that indicates the presence or absence of the corresponding entry on the network adaptor 100. This flag is prepared for allowing the virtual switch 200 to know the type of the filter entry held by the network adaptor 100.

The packet switching function 220 carries out a switching process in accordance with the action obtained at the step A20 (Step A30). Typically, the packet switching function 220 outputs the packet from the output port specified by the action. The outputted packet is transmitted to the network adaptor 100 or virtual machine 300.

On the other hand, the process load measuring function 260 updates the load information in response to the packet process (Step A40). Also, the route change determination function 270 compares the load related to the flow of the processed packet with a predetermined threshold by referring to the load information (Step A50). If the load exceeds the predetermined threshold (Step A50; Yes), the route change determination function 270 determines the flow as the overload flow, and assigns to the first route pattern flow. The route change determination function 270 then determines that the NIC offload is to be performed on the relevant flow and reports to the VM identifying function 230.

Figure 18:
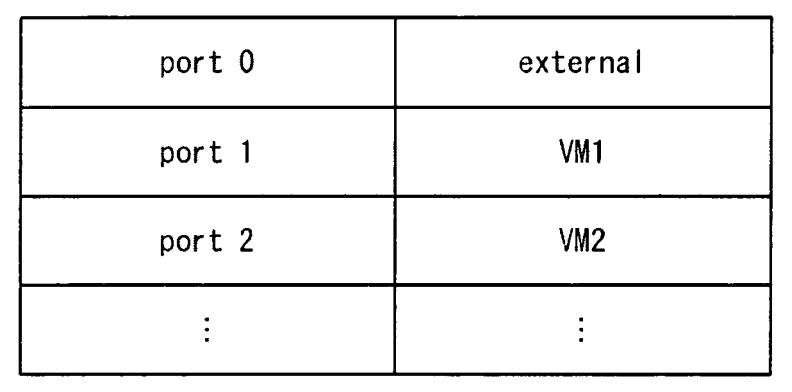

Subsequently, the virtual switch 200 carries out an offload setting process (Step A60). Specifically, for the flow specified by the route change determination function 270, the VM identifying function 230 specifies the virtual machine 300 which transmits or receives the packet belonging to the specified flow (Step A61). Here, the VM identifying function 230 may specify the virtual machine 300 by referring to a port-to-VM association table as shown in FIG. 18. The queue determination function 240 determines the transmission or reception queue correlated to the virtual machine 300 specified by the VM identifying function 230 (Step A62). The NIC setting function 250 prepares a filter entry which should be set for the filter table FILT by properly referring to the transmission or reception queue. The NIC setting function 250 then informs the prepared filter entry of the network adaptor 100 and sets the filter table FILT (Step A63). Also, the NIC setting function 250 sets the flag of the corresponding entry shown in FIG. 17 to "present".

Figure 19:
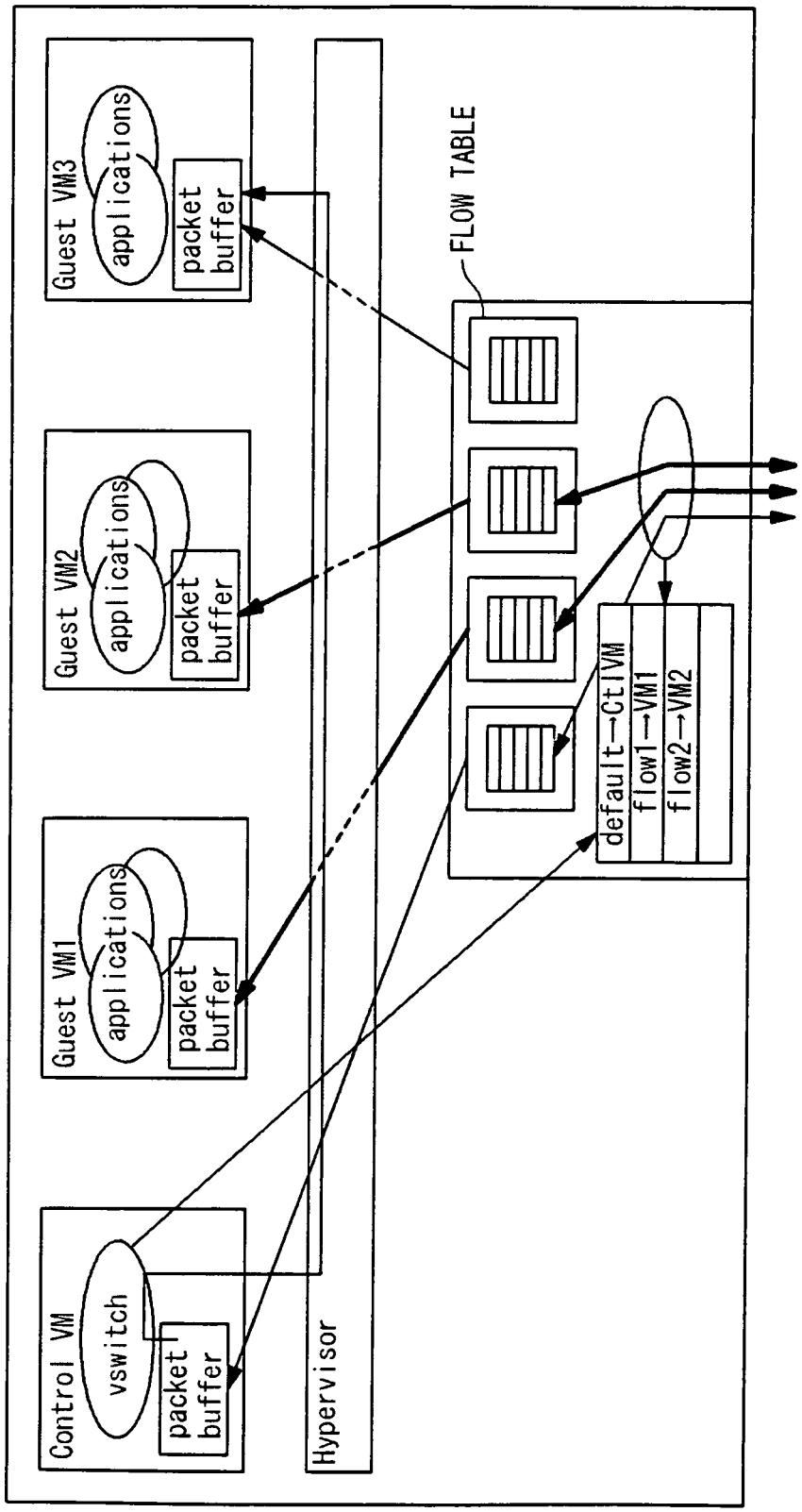
FIG. 19 is a conceptual view showing the process in the first embodiment.

In this way, the NIC-offload is performed on the flow determined as the overload flow. FIG. 19 is the conceptual view showing the process image in the first embodiment. It should be noted that the offload setting is released when a flow returns from the overload flow to the usual load flow. When the offload setting is released, the filter entry with regard to the flow may be removed from the filter table FILT. Also, the flag of the corresponding entry shown in FIG. 17 is set to "absent".

The role of the address-attached data generation function 280 will be described below with reference to FIG. 20. There is a case in which a packet distribution is carried out from the data link to a virtual machine 300 through the virtual switch 200 under a situation in which the corresponding filter entry does not exist in the network adaptor 100. Here, when there is no information indicating whether the packet outputted from the virtual switch 200 is addressed to the "exterior" or the "virtual machine (VM)", the network adaptor 100 cannot identify the destination of the packet. To address this, address data are attached to the packet itself. Specifically, the address-attached data generation function 280 in the virtual switch 200 attaches the address data which indicates whether the packet is addressed to the "exterior" or the "VM", to the packet outputted by the virtual switch 200. The network adaptor 100 is provided with a packet transmission determination function 150 which determines the packet distribution destination by referring to the address data.

Figure 20:
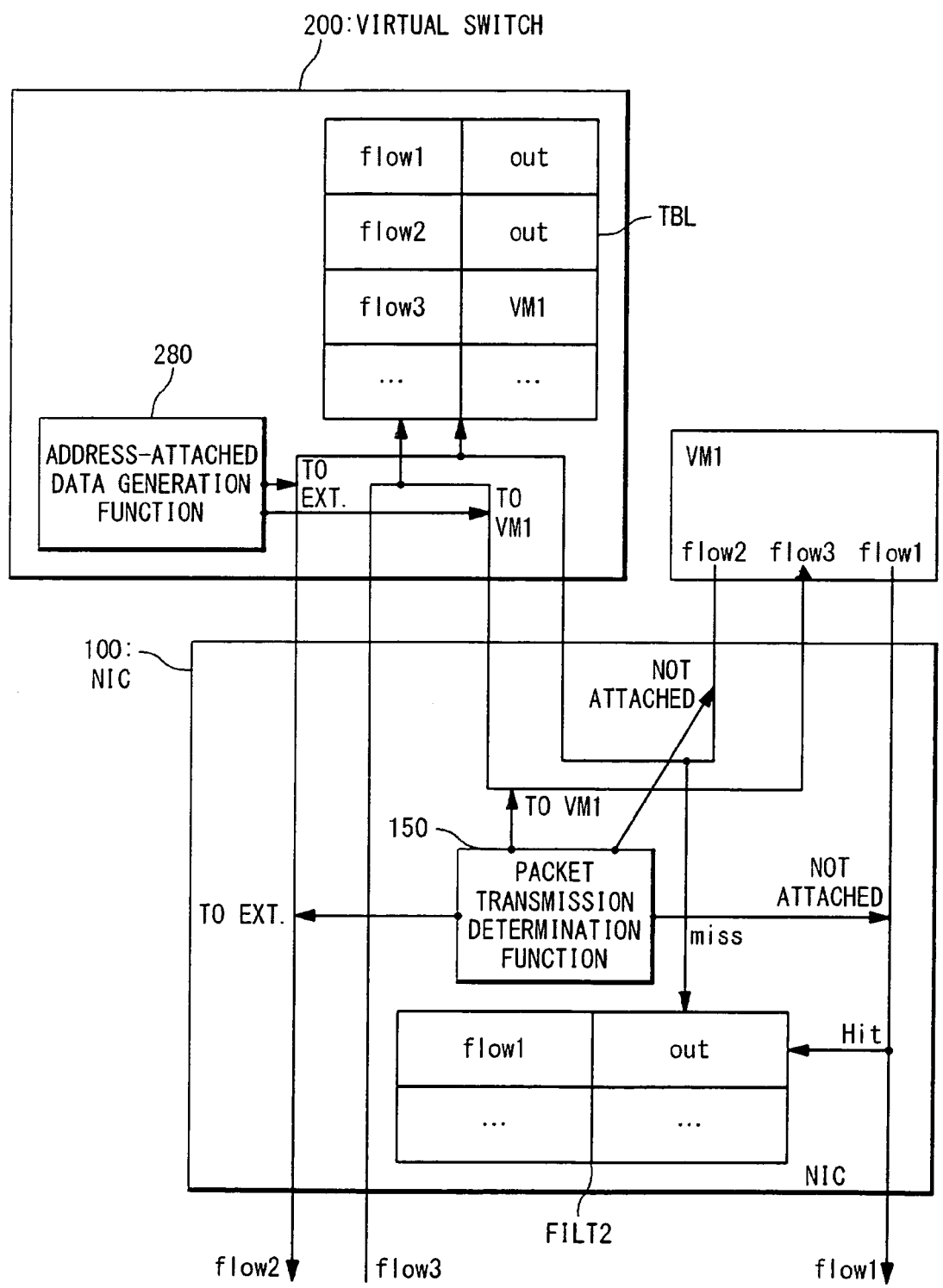
FIG. 20 is a conceptual view showing the process in the first embodiment.

As an example, let us consider the flow "flow3" which is addressed to the virtual machine VM1 in FIG. 20. Upon reception of a packet of the flow "flow3", the virtual switch 200 refers to the flow table TBL and consequently recognizes that the packet is addressed to the virtual machine VM1. Thus, the address-attached data generation function 280 attaches to the packet address data which indicates that the packet is addressed to "VM1". When the packet arrives at the network adaptor 100, the packet transmission determination function 150 determines that the packet is to be transmitted to the virtual machine VM1 by referring to the address data attached to the packet. For the flows "flow1" and "flow2" in FIG. 20, on the other hand, no address data are attached to transmission packets from the virtual machine VM1. In that case, as mentioned above, the transmission packet is processed in accordance with the filter entry in the transmission filter table FILT2.

3-2. Second Embodiment

In a second embodiment, the NIC offload setting is carried out upon reception of a "predetermined packet". When receiving a "predetermined packet" of a certain flow, the route switcher 60 assigns the flow to the first route pattern flow, on which the NIC offload is performed. From then on, the NIC-offload is performed on the certain flow, and packets belonging to the flow bypass the virtual switch 200. Also, there is a case in which a period during which no packet of the first route pattern flow is processed continues for a certain time or more, that is, a case in which a timeout occurs for the first route pattern flow. In that case, the route switcher 60 may switch the flow from the first route pattern flow to the second route pattern flow.

One example of the "predetermined packet" is the first packet, which is the packet firstly received among packets belonging to a certain flow, that is, the packet received in a situation in which the entry of the flow is not still prepared. In this case, the NIC-offload is performed on the first packet and packets following the first packet of the flow. Also, as another example of the "predetermined packet" is a packet including an HTTP request URL. In this case, after a DPI (Deep Packet Inspection) process is carried out in the virtual switch 200, the NIC-offload is performed on the remaining packets. Here, the DPI process is an operation for determining the destination or the processing method of the flow to which a packet belongs, by using the information included in the packet concerning a layer higher than a transport layer, for example, the contents of URL included by the packet.

As thus described, the NIC-offload is performed on most of the traffics in a data plane in the second embodiment. This allows further reducing the traffic concentration on the virtual switch 200, compared with the first embodiment. Also, the NIC-offload is not performed for a control plane, while most of the traffics of the data plane are NIC-offloaded. Hence, the flexibility achieved by the use of the virtual switch 200 is reserved.

In the following, a description is given of a specific example of the configuration and operation of the second embodiment. In this example, the route switcher 60 is incorporated in the virtual switch 200. Also, the "predetermined packet" is defined as the first packet.

Figure 21:
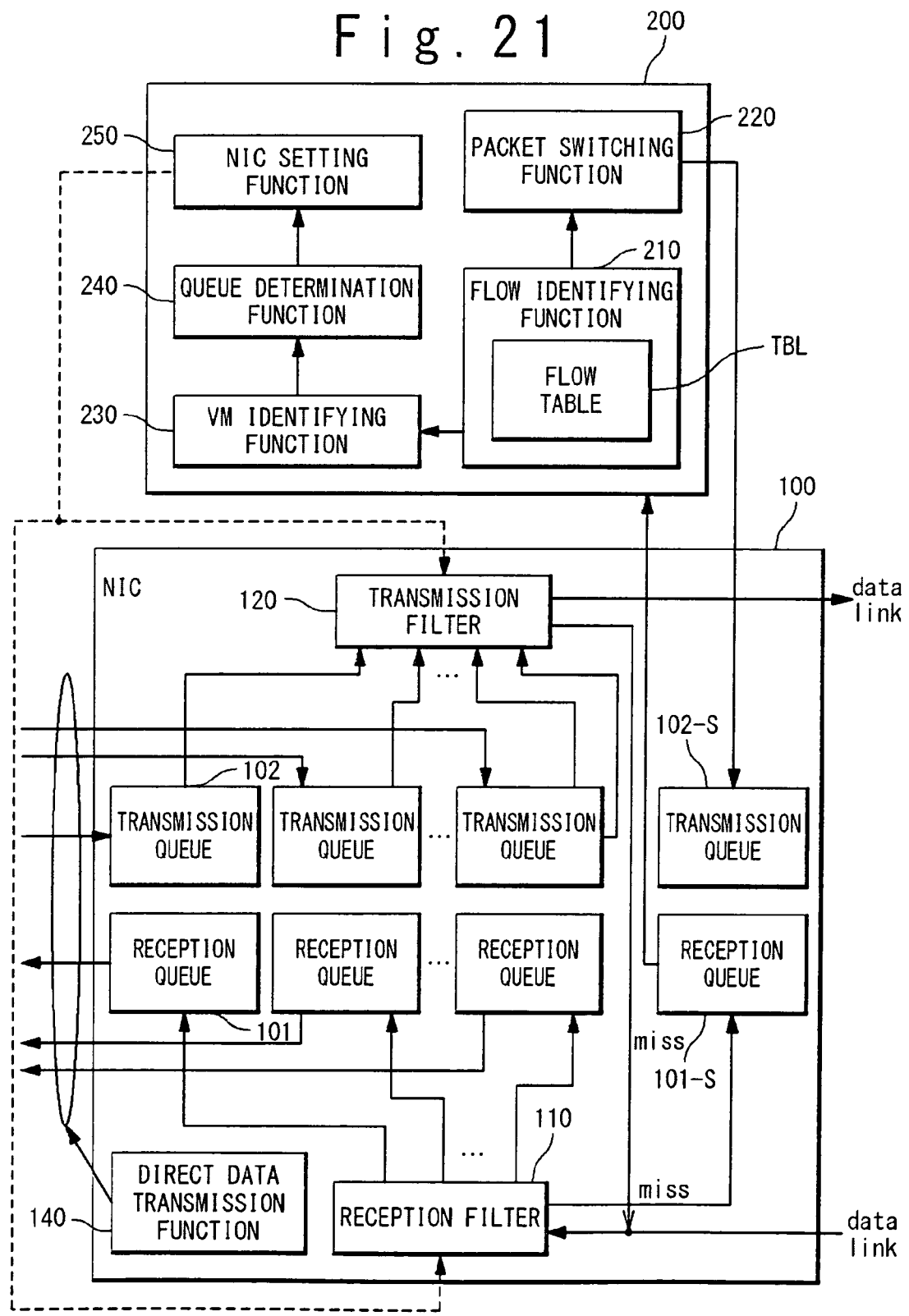
FIG. 21 is a block diagram showing a configuration example according to a second embodiment of the present invention.

FIG. 21 is the block diagram showing configuration examples of the network adaptor 100 and the network adaptor 100 in the second embodiment. The configuration of the network adaptor 100 is similar to that shown in FIG. 9. It should be noted that the illustrations of the reception filter table FILT1 and the transmission filter table FILT2 are omitted. The configuration of the virtual switch 200 is similar to that shown in the afore-mentioned FIG. 13.

Figure 22:
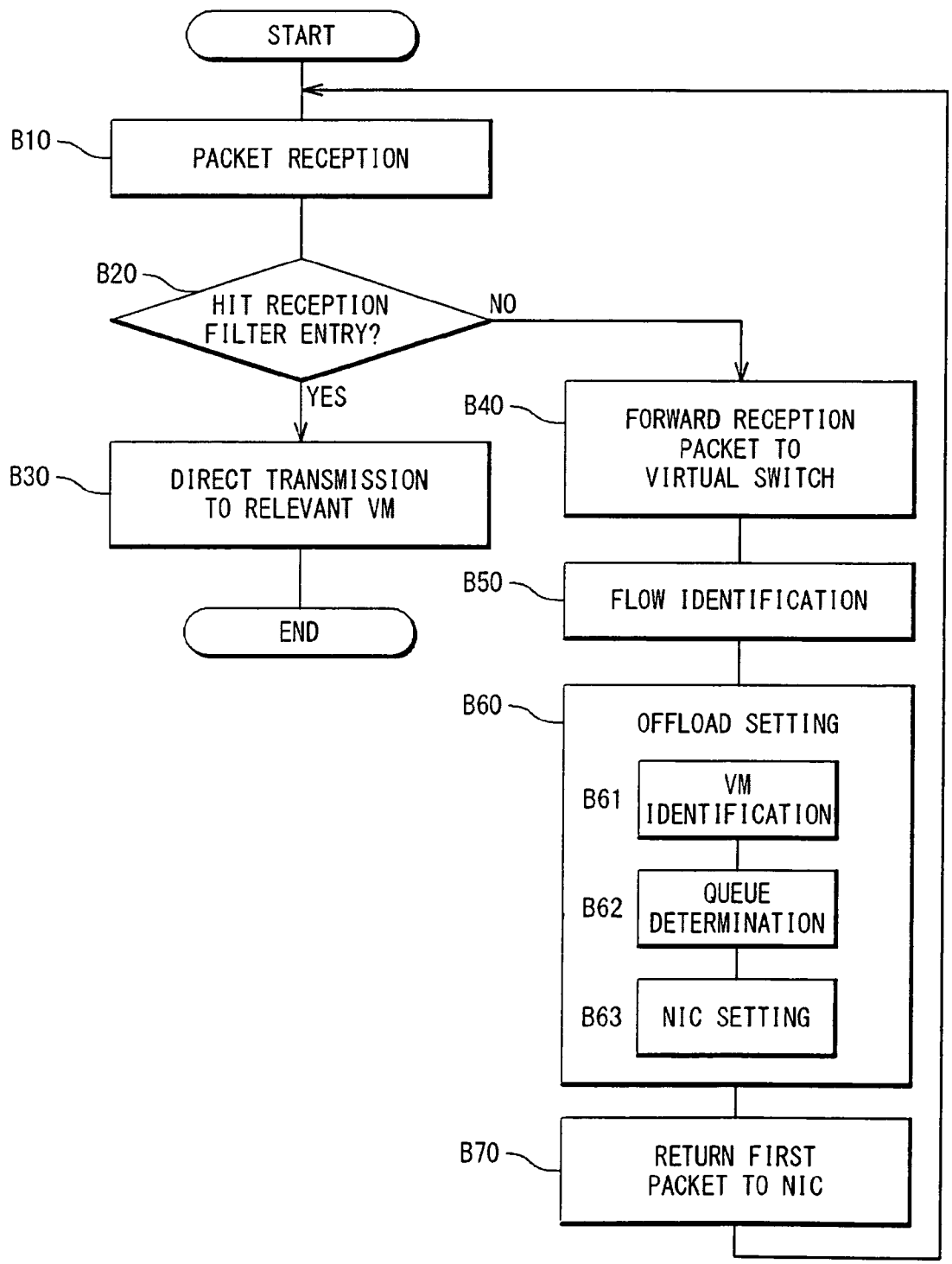
FIG. 22 is a flowchart showing the process in the second embodiment.

FIG. 22 is the flowchart showing a process example in the second embodiment. The reception filter 110 in the network adaptor 100 receives a packet from the data link (Step B10). The reception filter 110 uses the header information of the received packet and retrieves an exact match entry in the reception filter table FILT1 (Step B20). If there is an exact match entry matching with the flow of the received packet (Step B20; Yes), the reception filter 110 stores the received packet in the reception queue 101 associated with the corresponding virtual machine 300. The received packet is directly transmitted to the corresponding virtual machine 300 by the direct data transfer function 140 (Step B30).

When there is no exact match entry matching with the flow of the received packet (Step B20; No), on the other hand, the reception filter 110 stores the received packet in the reception queue 101-S associated with the virtual switch 200. The received packet stored in the reception queue 101-S is transmitted to the virtual switch 200 (Step B40).

The virtual switch 200 receives the received packet. In accordance with the header information of the received packet, the flow identifying function 210 identifies the flow to which the packet belongs, and searches the flow table TBL (Step B50). This results in that no flow entry matching with the received packet (the exact match entry) exists in the flow table TBL. Thus, the flow identifying function 210 identifies the received packet as the first packet and determines that the NIC-offload is to be performed on the flow of the received packet and reports to the VM identifying function 230.

In succession, the virtual switch 200 carries out the offload setting process (Step B60). Specifically, with regard to the flow specified by the flow identifying function 210, the VM identifying function 230 specifies a virtual machine 300 which transmits or receives packets belonging to the flow (Step B61). The queue determination function 240 determines the transmission/reception queue correlated to the virtual machine 300 that is specified by the VM identifying function 230 (Step B62). The NIC setting function 250 properly refers to the transmission/reception queue and consequently prepares a filter entry which is to be set for the filter table FILT. Then, the NIC setting function 250 informs the prepared filter entry of the network adaptor 100 to set the filter table FILT (Step B63). Also, the NIC setting function 250 stores a copy of the filter entry also in the flow table TBL.

The packet switching function 220 returns the first packet to the network adaptor 100 (Step B70). This time, an exact match entry in the reception filter table FILT1 is hit (Step B20; Yes). Thus, the first packet is directly transmitted to the corresponding virtual machine 300 by the direct data transfer function 140 (Step B30). The same goes for the packets following the first packet. In this way, the NIC-offload is performed on the flow.

When a timeout occurs with regard to the flow on which the NIC offload is performed, the offload setting may be released. For example, the reception filter 110 or the transmission filter 120 in the network adaptor 100 records the final matching time in the filter entry of the filter table FILT. The flow identifying function 210 in the virtual switch 200 checks the final matching time at intervals of a given period to detect a timeout. When a timeout occurs in a certain flow, the flow identifying function 210 instructs the release of the offload setting for the flow. The NIC setting function 250 removes the filter entry related to the relevant flow from the reception filter table FILT1. Also, the NIC setting function 250 also removes the relevant filter entry from the flow table TBL.

3-3. Third Embodiment

Figure 23:
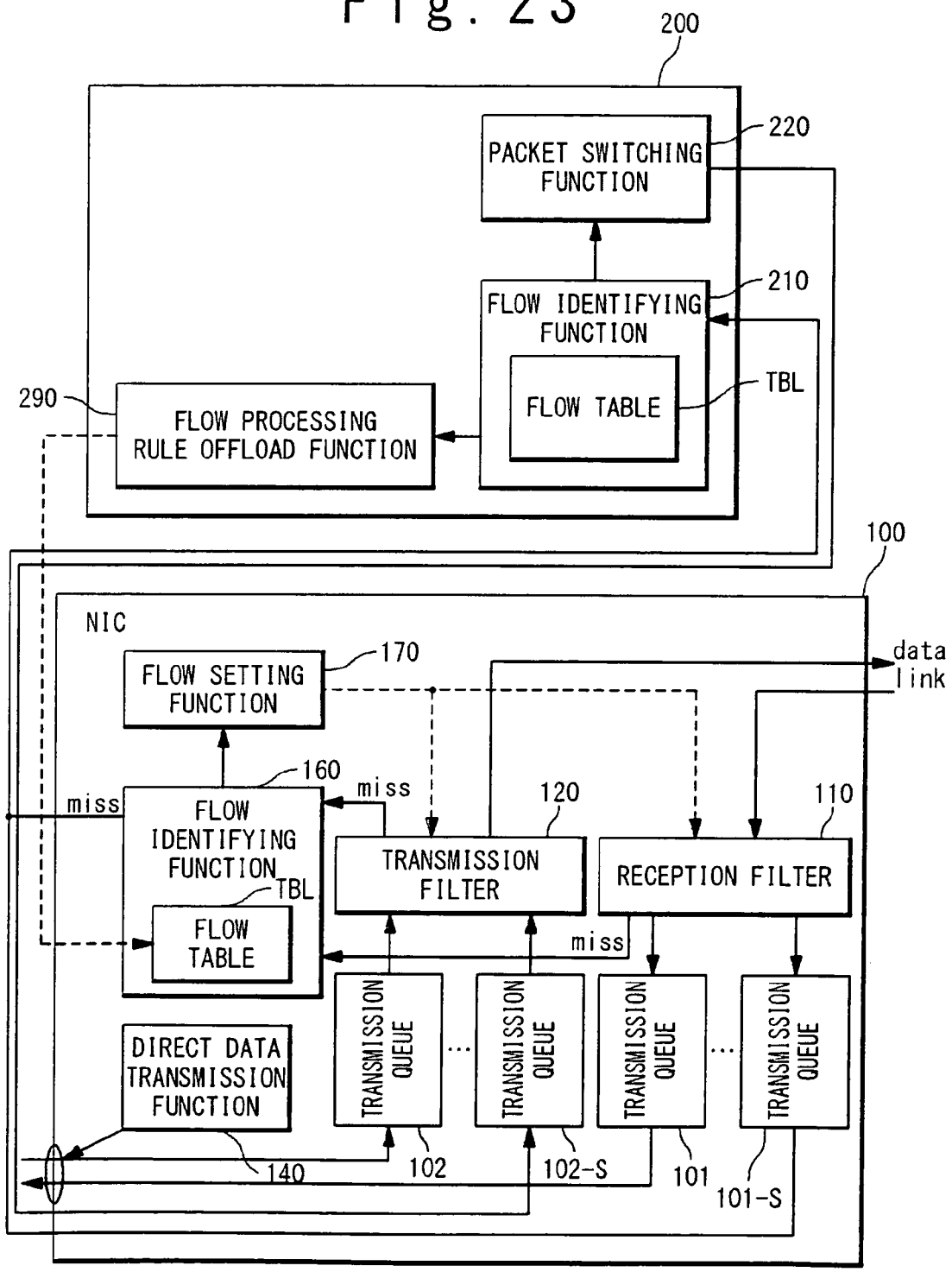
FIG. 23 is a block diagram showing a configuration example according to a third embodiment of the present invention.

FIG. 23 is the block diagram showing configuration examples of the network adaptor 100 and the virtual switch 200 in a third embodiment. In the following, a description is given mainly of differences from the second embodiment.

The network adaptor 100 is provided with a flow identifying function 160 and a flow setting function 170 in addition to the configuration shown in FIG. 21. The flow identifying function 160 is similar to the flow identifying function 210 in the virtual switch 200. In the flowchart in FIG. 22, when there is no exact match entry matching with the flow of the received packet (Step B20; No), the reception filter 110 transfers the received packet to the flow identifying function 160 (Step B40). The flow setting function 170 sets a filter entry with regard to the flow specified by the flow identifying function 160 to the filter table FILT. Those functions may be attained by a general processor disposed in the network adaptor 100.

As thus described, the route switcher 60 is incorporated in the network adaptor 100 in the third embodiment. That is, the NIC-offload is performed on the setting of the filter table FILT in addition to the data plane.

More generally, the NIC-offloaded is performed on "standard processes", such as setting of the filter table FILT in the third embodiment. In other words, the virtual switch 200 delegates programs for carrying out the standard processes to the network adaptor 100. Such a program for carrying out a standard process may be implemented as an action of a wildcard match entry in the flow table TBL. The action may be a program for setting NAPT (Network Address/Port Translation), for example. This allows performing an NAPT process on the network adaptor 100 for each flow. The virtual switch 200 is provided with a flow processing rule offload function 290. The flow processing rule offload function 290 sets contents of a part or whole of the own flow table TBL (the exact match entry and the wildcard match entry) to the flow table TBL on the network adaptor 100.

As thus described, the NIC offload is performed on the standard processes in the third embodiment. Processes which cannot be completed in a short time and advanced extension processes are processed in the virtual switch 200 as in a normal operation.

4. Another Example of Route Switching Process

The means of the route switching is not limited to those described in the foregoing section 2. Another example of the route switching process will be described below. In this processing example, the route of the transmission packet is branched in the virtual machine 300.

Figure 24:
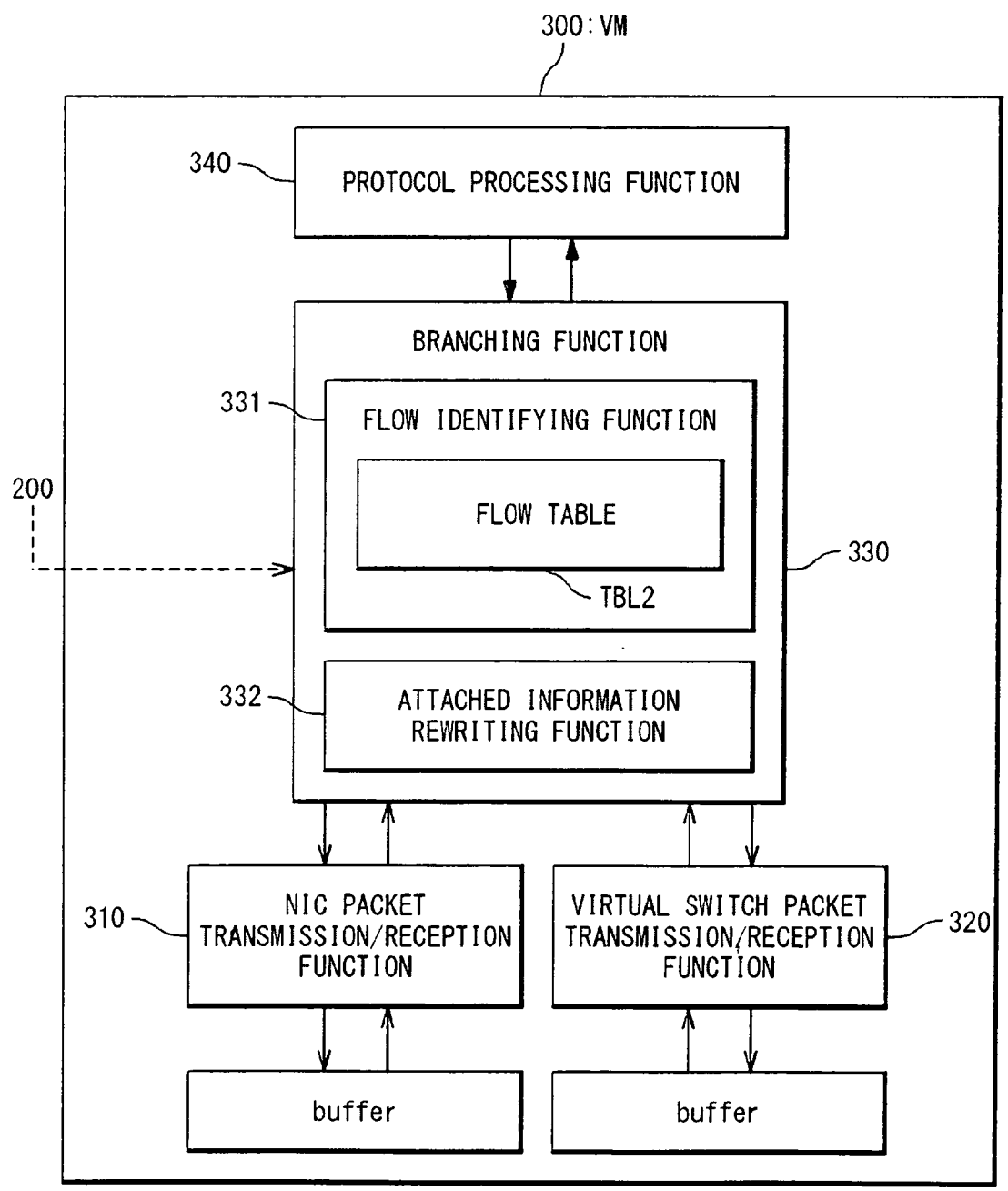
FIG. 24 is a block diagram describing another example of the route switching process according to one embodiment of the present invention.

FIG. 24 is a block diagram showing the configuration of the virtual machine 300 in this processing example. The virtual machine 300 is provided with an NIC packet transmission/reception function 310, a virtual switch packet transmission/reception function 320, a branching function 330 and a protocol processing function 340. The protocol processing function 340 is attained by a program which carries out a protocol process (typically, a TCP/IP stack). The NIC packet transmission/reception function 310 (first transmission/reception function) is attained by the direct data transfer function 140 in the network adaptor 100 and a device driver adapted to transmit and receive packets. The virtual switch packet transmission/reception function 320 (second transmission/reception function) is attained by the virtual switch 200 and the device driver adapted to transmit and receive packets.

The branching function 330 is disposed between the protocol processing function 340 and the packet transmission/reception functions 310, 320. The branching function 330 receives transmission packets from the protocol processing function 340 and transfers the transmission packets to one of the NIC packet transmission/reception function 310 and the virtual switch packet transmission/reception function 320. For performing this transferring process (that is, the sorting of the transmission packets), the branching function 330 refers to a flow table TBL2 indicating the relation between the flows and the packet transfer destinations. The packet transfer destinations are selected from the NIC packet transmission/reception function 310 (first packet transfer destination) or the virtual switch packet transmission/reception function 320 (second packet transfer destination).

FIG. 25 is a conceptual view showing the flow table TBL2. The flow table TBL2 has a plurality of table entries. Each table entry indicates: a key for identifying a flow and an action to be performed on transmission packets of the flow. The key is the flow identification information and composed of a combination of the predetermined protocol header fields in the header information of the transmission packets. The action indicates the transfer destination of the transmission packets. For example, the action "NIC" indicates that the transfer destination of the transmission packets is the NIC packet transmission/reception function 310 (first packet transfer destination). Also, the action "vswitch" indicates that the transfer destination of the transmission packet is the virtual switch packet transmission/reception function 320 (second packet transfer destination). The flow table TBL2 is stored in the predetermined storage device (typically, in the main memory 30).

The branching function 330 refers to the flow table TBL2 and thereby transfers transmission packets from the virtual machine 300 to the packet transfer destination correlated to the flow of the transmission packet. In detail, the branching function 330 contains a flow identifying function 331 and an attached information rewriting function 332. The flow identifying function 331 identifies the flow of the transmission packets on the basis of the header information of the transmission packets. Moreover, the flow identifying function 331 refers to the flow table TBL2 and determines the packet transfer destination correlated to the relevant flow. Also, the attached information rewriting function 332 rewrites a transmission interface within attached information of the transmission packets to the packet transfer destination as the result of the above determination. Then, the branching function 330 transfers the transmission packets to the corresponding packet transfer destination.

When the packet transfer destination is the NIC packet transmission/reception function 310, the NIC packet transmission/reception function 310 receives the transmission packets from the branching function 330. The NIC packet transmission/reception function 310 stores the received transmission packets in a buffer and instructs the network adaptor 100 to transmit the packets. The direct data transfer function 140 in the network adaptor 100 obtains the transmission packets from the buffer and stores the transmission packets in the transmission queue 102 corresponding to the virtual machine 300 of the transmission source.

When the packet transfer destination is the virtual switch packet transmission/reception function 320, the virtual switch packet transmission/reception function 320 receives the transmission packets from the branching function 330. The virtual switch packet transmission/reception function 320 stores the received transmission packets in the buffer and requests the hypervisor 50 to transfer the packets. The hypervisor 50 instructs the virtual switch 200 to process the transmission packets. The virtual switch 200 obtains the transmission packets from the buffer and carries out the switching process.

It should be noted that the virtual machine 300 receives the reception packets from the network adaptor 100 or virtual switch 200. For the network adaptor 100, the NIC packet transmission/reception function 310 receives the reception packets and forwards the reception packets to the branching function 330. For the virtual switch 200, on the other hand, the virtual switch packet transmission/reception function 320 receives the reception packets and forwards the reception packets to the branching function 330. The branching function 330 pretends to receive the reception packets from the same interface, for both of the cases. To achieve this, the attached information rewriting function 332 rewrites the reception interface indicated by the attached information of each reception packet to the branching function 330. The branching function 330 then transmits the reception packets to the protocol processing function 340. Consequently, multiple reception routes cannot be perceived from the protocol stack.

It should be noted the attached information of a packet means to include the attributes of the packet and additional information of the packets which are held, correlated to the data of the packet. The attached information typically includes a length of the packet, a payload and a head address of a header data of each protocol, in addition to the reception interface. The "interfaces", such as the transmission interface and the reception interface, means virtual connection points between the virtual machines 300 and the network. In the example of FIG. 24, the output/input ports of the transmission line to/from the network adaptor 100 and the output/input ports of the transmission line to/from the virtual switch 200 are the "interfaces".

In this processing example, the transmission filter table FILT2 is not provided in the network adaptor 100. Instead, the flow table TBL2 is provided in the virtual machine 300. The route switcher 60 dynamically changes the settings of the flow table TBL2 in each virtual machine 300, instead of dynamically changing the settings of the transmission filter table FILT2 in the network adaptor 100. Specifically, the route switcher 60 sets the flow table TBL2 so that the first route pattern flow is correlated to the first packet transfer destination, and the second route pattern flow is correlated to the second packet transfer destination. As a result, the first route pattern flow is processed not through the virtual switch 200, namely, the NIC offload is performed on the first route pattern flow. On the other hand, the second route pattern flow is processed by the virtual switch 200.

It should be noted that the route switcher 60 sets the reception filter table FILT1 in the network adaptor 100, similarly to the case of the foregoing section 2. Also, the route pattern may be asymmetric between the receiving side and the transmitting side.

Figure 26:
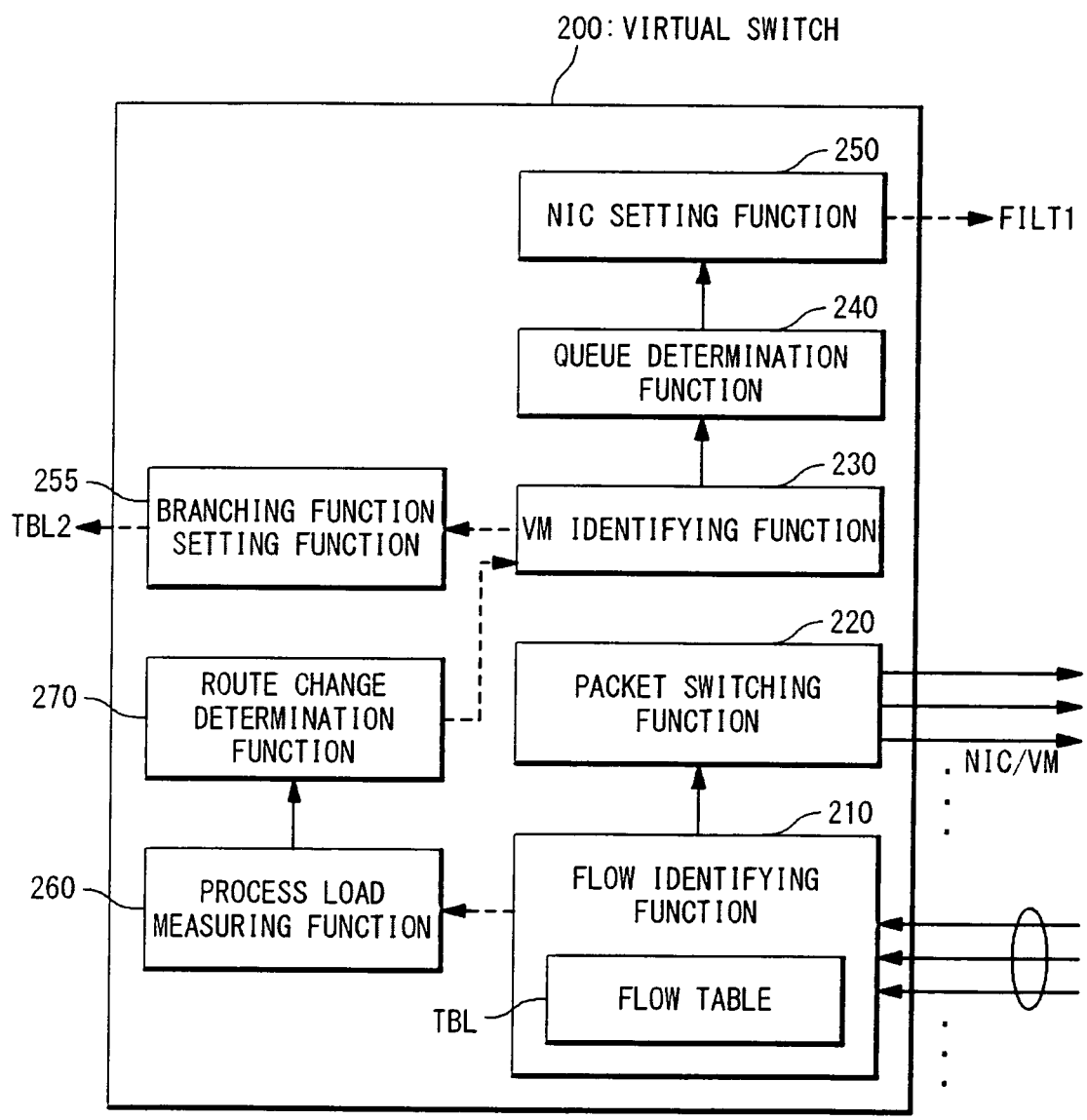
FIG. 26 is a block diagram showing the configuration of the virtual switch in the case of FIG. 24.

The route switcher 60 is incorporated in, for example, the virtual switch 200. FIG. 26 is a block diagram showing the function configuration example of the virtual switch 200 in that case. The virtual switch 200 shown in FIG. 26 further contains a branching function setting function 255, in addition to the configuration shown in FIG. 13 or FIG. 15 mentioned above. The NIC setting function 250 sets the reception filter table FILT1 in the network adaptor 100. On the other hand, the branching function setting function 255 sets the flow table TBL2 in the virtual machine 300. The virtual machine 300 adds, removes and updates the entries of the flow table TBL2 on the basis of the settings of the branching function setting function 255.

This processing example may be combined with any of the above-mentioned first to third embodiments. In such case, the "setting of the transmission filter table FILT2 in the network adaptor 100" is replaced with the "setting of the flow table TBL2 in the virtual machine 300" in the above description.

In the above, embodiments of the present invention are with reference to the attached drawings. It should be noted, however, that the present invention is not limited to the above-mentioned embodiments and may be properly changed by one skilled in the art within the range departing from the concepts thereof.

This application claims the priority based on Japanese Patent Application No. 2009-276679, filed on Dec. 4, 2009, the whole disclosure of which is herein incorporated by reference.

What is claimed is:

1. A server, comprising:
   a processor;
   a physical network adapter connected to said processor; and
   a route switcher, wherein said processor includes:
   virtual machines; and
   a virtual switch relaying packets exchanged between said virtual machines and an exterior, wherein said physical network adapter has a transfer function comprising transmitting and receiving packets to and from said virtual machines other than through said virtual switch, wherein said route switcher dynamically switches a specific flow of packets transmitted and received by one of said virtual machines between first and second route pattern flows, wherein said first route pattern flow comprises a flow in which packets are directly transmitted and received between said physical network adapter and the one of said virtual machines other than through said virtual switch by using said transfer function, and wherein said second route pattern flow comprises a flow in which packets are transmitted and received between said physical network adapter and the one of said virtual machines through said virtual switch other than through direct connections between said physical network adapter and said virtual machines, wherein said physical network adapter includes:
- a reception filter receiving a reception packets;
- a storage unit storing a reception filter table indicating a relation between flows and reception actions;
- first reception queues each storing packets to be directly transmitted to an associated one of said virtual machines; and
- a second reception queue storing packets to be transmitted to said virtual switch, wherein said reception filter refers to said reception filter table and performs a reception action correlated to a flow of said reception packet selected from said reception actions on said reception packet, wherein, when switching the specific flow to the first route pattern flow, said route switcher sets said reception filter table so that the specific flow of the packets transmitted and received by the one of said virtual machines is correlated to a first reception action, wherein, when switching the specific flow to the second route pattern flow, said route switcher sets said reception filter table so that the specific flow of the packets transmitted and received by the one of said virtual machines is correlated to a second reception action, wherein said first reception action comprises storing said reception packets into a reception queue associated with the one of the virtual machines of the first reception queues, and transmitting said reception packets to the one of said virtual machines from the associated reception queue by using said transfer function, wherein said second reception action comprises storing said reception packets into said second reception queue and transmitting said reception packet to said virtual switch from said second reception queue, and wherein said reception filter refers to said reception filter table to perform the reception action correlated to the specific flow on the reception packets.

2. The server according to claim 1,
wherein said physical network adapter further includes:
- transmission queues each storing packets directly received from associated one of said virtual machines by using said transfer function; and
- a transmission filter receiving transmission packets from the transmission queues, wherein said storage unit further stores a transmission filter table indicating a relation between flows and transmission actions, wherein, when switching the specific flow to the first route pattern flow, said route switcher sets said transmission filter table so that the specific flow of the packets transmitted and received by the one of said virtual machines is correlated to a first transmission action, wherein, when switching the specific flow to the second route pattern flow, said route switcher sets said transmission filter table so that the specific flow of the packets transmitted and received by the one of said virtual machines is correlated to a second transmission action, wherein said first transmission action comprises transmitting transmission packets received from the one of said virtual machines and stored in a transmission queue associated with the one of said virtual machines of the transmission queues to the exterior, wherein said second transmission action comprises looping back said transmission packets received from the one of said virtual machines from the transmission queue associated with the one of said virtual machines to said reception filter as said reception packets, and wherein said transmission filter refers to said transmission filter table to perform the transmission action correlated to the specific flow on the transmission packets.

3. The server according to claim 1, wherein each of said virtual machines includes:
- a first transmission/reception function transmitting and receiving packets to and from said physical network adapter, other than through said virtual switch;
- a second transmission/reception function transmitting and receiving packets to and from said virtual switch; and
- a branching function referring a flow table indicating a relation between flows and packet transfer destinations and forwarding a transmission packet from said each of said virtual machines to a packet transfer destination correlated to a flow of said transmission packet selected from said packet transfer destinations, wherein said route switcher sets said flow table so that said first route pattern flow is correlated to a first packet transfer destination and said second route pattern flow is correlated to a second packet transfer destination, wherein said first packet transfer destination comprises said first transmission/reception function, and wherein said second packet transfer destination comprises said second transmission/reception function.

4. The server according to claim 1,
wherein said route switcher measures a load of the specific flow, based on the packets transmitted and received by the one of said virtual machines,
and
wherein, when the load of the specific flow exceeds a predetermined threshold, said route switcher switches said specific flow to said first route pattern flow.

5. The server according to claim 1, wherein, upon reception of a predetermined packet belonging to the specific flow, said route switcher switches said specific flow to said first route pattern flow.

6. The server according to claim 5, wherein said predetermined packet comprises a first packet of the specific flow.

7. The server according to claim 5, wherein said predetermined packet comprises a packet including a Hypertext Transfer Protocol (HTTP) request Uniform Resource Locator (URL).

8. The server according to claim 1, wherein said route switcher is incorporated in said virtual switch.

9. The server according to claim 1, wherein said route switcher is incorporated in said physical network adapter.

10. A non-transitory recording medium recording a flow control program which causes a server to provide a route switching function,
wherein said server includes:
a processor; and
a physical network adapter,
wherein said processor includes:
virtual machines; and
a virtual switch relaying packets exchanged between said virtual machines and an exterior,
wherein said physical network adapter has a transfer function comprising transmitting and receiving packets to and from said virtual machines other than through said virtual switch,
wherein said route switching function dynamically switches a specific flow of packets transmitted and received by one of said virtual machines between first and second route pattern flows, and
wherein said first route pattern flow comprises a flow in which packets are directly transmitted and received between said physical network adapter and the one of said virtual machines other than through said virtual switch by using said transfer function, and
wherein said second route pattern flow comprises a flow in which packets are transmitted and received between said physical network adapter and the one of said virtual machines through said virtual switch other than through direct connections between said physical network adapter and said virtual machines,
wherein said physical network adapter includes:
a reception filter receiving a reception packets;
a storage unit storing a reception filter table indicating a relation between flows and reception actions;
first reception queues each storing packets to be directly transmitted to an associated one of said virtual machines; and
a second reception queue storing packets to be transmitted to said virtual switch,
wherein said reception filter refers to said reception filter table and performs a reception action correlated to a flow of said reception packet selected from said reception actions on said reception packet,
wherein, when switching the specific flow to the first route pattern flow, said route switcher sets said reception filter table so that the specific flow of the packets transmitted and received by the one of said virtual machines is correlated to a first reception action,
wherein, when switching the specific flow to the second route pattern flow, said route switcher sets said reception filter table so that the specific flow of the packets transmitted and received by the one of said virtual machines is correlated to a second reception action,
wherein said first reception action comprises storing said reception packets into a reception queue associated with the one of the virtual machines of the first reception queues, and transmitting said reception packets to the one of said virtual machines from the associated reception queue by using said transfer function,
wherein said second reception action comprises storing said reception packets into said second reception queue and transmitting said reception packet to said virtual switch from said second reception queue, and
wherein said reception filter refers to said reception filter table to perform the reception action correlated to the specific flow on the reception packets.

11. A physical network adapter to be connected to a processor of a server, said processor including virtual machines and a virtual switch relaying packets exchanged between said virtual machines and an exterior,
wherein said physical network adapter has a transfer function transmitting and receiving packets to and from said virtual machines,
wherein said physical network adapter comprises a route switcher,
wherein said route switcher dynamically switches a specific flow of packets transmitted and received by one of said virtual machines between first and second route pattern flows,
wherein said first route pattern flow comprises a flow in which packets are directly transmitted and received between said physical network adapter and the one of said virtual machines other than through said virtual switch by using said transfer function, and
wherein said second route pattern flow comprises a flow in which packets are transmitted and received between said physical network adapter and the one of said virtual machines through said virtual switch other than through direct connections between said physical network adapter and said virtual machines,
wherein said physical network adapter includes:
a reception filter receiving a reception packets;
a storage unit storing a reception filter table indicating a relation between flows and reception actions;
first reception queues each storing packets to be directly transmitted to an associated one of said virtual machines; and
a second reception queue storing packets to be transmitted to said virtual switch,
wherein said reception filter refers to said reception filter table and performs a reception action correlated to a flow of said reception packet selected from said reception actions on said reception packet,
wherein, when switching the specific flow to the first route pattern flow, said route switcher sets said reception filter table so that the specific flow of the packets transmitted and received by the one of said virtual machines is correlated to a first reception action,
wherein, when switching the specific flow to the second route pattern flow, said route switcher sets said reception filter table so that the specific flow of the packets transmitted and received by the one of said virtual machines is correlated to a second reception action,
wherein said first reception action comprises storing said reception packets into a reception queue associated with the one of the virtual machines of the first reception queues, and transmitting said reception packets to the one of said virtual machines from the associated reception queue by using said transfer function,
wherein said second reception action comprises storing said reception packets into said second reception queue and transmitting said reception packet to said virtual switch from said second reception queue, and
wherein said reception filter refers to said reception filter table to perform the reception action correlated to the specific flow on the reception packets.

12. A flow control method for a server including a processor and a physical network adapter connected to said processor, said processor including virtual machines; and a virtual switch relaying packets exchanged between said virtual machines and an exterior, and said physical network adapter having a transfer function comprising transmitting and receiving packets to and from said virtual machines other than through said virtual switch, said method comprising:

dynamically switching a specific flow of packets transmitted and received by one of said virtual machines between first and second route pattern flows, wherein said first route pattern flow comprises a flow in which packets are directly transmitted and received between said physical network adapter and the one of said virtual machines other than through said virtual machine by using said transfer function, and wherein said second route pattern flow comprises a flow in which packets are transmitted and received between said physical network adapter and the one of said virtual machines through said virtual switch other than through direct connections between said physical network adapter and said virtual machines, wherein said physical network adapter includes:

a reception filter receiving a reception packets;

a storage unit storing a reception filter table indicating a relation between flows and reception actions;

first reception queues each storing packets to be directly transmitted to an associated one of said virtual machines; and a second reception queue storing packets to be transmitted to said virtual switch, wherein said reception filter refers to said reception filter table and performs a reception action correlated to a flow of said reception packet selected from said reception actions on said reception packet, wherein, when switching the specific flow to the first route pattern flow, said route switcher sets said reception filter table so that the specific flow of the packets transmitted and received by the one of said virtual machines is correlated to a first reception action, wherein, when switching the specific flow to the second route pattern flow, said route switcher sets said reception filter table so that the specific flow of the packets transmitted and received by the one of said virtual machines is correlated to a second reception action, wherein said first reception action comprises storing said reception packets into a reception queue associated with the one of the virtual machines of the first reception queues, and transmitting said reception packets to the one of said virtual machines from the associated reception queue by using said transfer function, wherein said second reception action comprises storing said reception packets into said second reception queue and transmitting said reception packet to said virtual switch from said second reception queue, and wherein said reception filter refers to said reception filter table to perform the reception action correlated to the specific flow on the reception packets.

* * * * *